US008606875B1

(12) United States Patent
Chouanard et al.

(10) Patent No.: US 8,606,875 B1
(45) Date of Patent: Dec. 10, 2013

(54) METHOD AND SYSTEM FOR AUTOMATIC DISTRIBUTION AND INSTALLATION OF A CLIENT CERTIFICATE IN A SECURE MANNER

(75) Inventors: Jean Chouanard, Redwood City, CA (US); Craig A. Vosburgh, Colorado Springs, CO (US)

(73) Assignee: Oracle America, Inc., Redwood City, CA (US)

( * ) Notice: Subject to any disclaimer, the term of this patent is extended or adjusted under 35 U.S.C. 154(b) by 3462 days.

(21) Appl. No.: 10/882,719

(22) Filed: Jun. 30, 2004

(51) Int. Cl.
*G06F 15/16* (2006.01)

(52) U.S. Cl.
USPC .......................................... 709/217; 709/219

(58) Field of Classification Search
USPC ......... 709/238, 244, 202–203, 227–229, 237, 709/245–248; 713/155–159, 175–178
See application file for complete search history.

(56) References Cited

U.S. PATENT DOCUMENTS

| 6,732,176 | B1 * | 5/2004 | Stewart et al. ................. 709/227 |
| 7,294,056 | B2 * | 11/2007 | Lowell et al. .................... 463/17 |
| 7,568,095 | B2 * | 7/2009 | Thornton et al. ............. 713/156 |
| 7,650,496 | B2 * | 1/2010 | Thornton et al. ............. 713/158 |
| 7,650,497 | B2 * | 1/2010 | Thornton et al. ............. 713/158 |
| 7,761,910 | B2 * | 7/2010 | Ransom et al. .................... 726/6 |
| 8,145,556 | B2 * | 3/2012 | Tealdi et al. ..................... 705/37 |
| 2002/0087862 | A1 * | 7/2002 | Jain et al. ...................... 713/176 |
| 2002/0116619 | A1 * | 8/2002 | Maruyama et al. ........... 713/176 |
| 2003/0169713 | A1 * | 9/2003 | Luo .............................. 370/338 |
| 2003/0212888 | A1 * | 11/2003 | Wildish et al. ................. 713/158 |
| 2004/0088543 | A1 * | 5/2004 | Garg et al. ..................... 713/157 |
| 2004/0243846 | A1 * | 12/2004 | Aboba et al. ................... 713/201 |
| 2005/0081026 | A1 * | 4/2005 | Thornton et al. ............. 713/156 |
| 2005/0081028 | A1 * | 4/2005 | Thornton et al. ............. 713/156 |
| 2005/0081029 | A1 * | 4/2005 | Thornton et al. ............. 713/156 |
| 2005/0091484 | A1 * | 4/2005 | Thornton et al. ............. 713/156 |
| 2005/0114653 | A1 * | 5/2005 | Sudia ............................ 713/158 |
| 2005/0144437 | A1 * | 6/2005 | Ransom et al. ............... 713/151 |
| 2005/0160259 | A1 * | 7/2005 | Ogura et al. .................. 713/156 |
| 2006/0015716 | A1 * | 1/2006 | Thornton et al. ............. 713/155 |
| 2006/0129803 | A1 * | 6/2006 | Gentry et al. ................. 713/156 |
| 2008/0010448 | A1 * | 1/2008 | Sabnis et al. .................. 713/156 |
| 2008/0040794 | A1 * | 2/2008 | Larson ........................... 726/15 |

OTHER PUBLICATIONS

Request for Comments 3280, Internet X.509 Public Key Infrastructure Certificate and Certificate Revocation List (CRL) profile, R. Housley, RSA, Polk & NIST et al, Apr. 2002.*

* cited by examiner

*Primary Examiner* — Sargon Nano
(74) *Attorney, Agent, or Firm* — Martine Penilla Group, LLP

(57) ABSTRACT

A method for distributing and installing a digital certificate is provided. In this method, an object is accessed. The object is used for requesting a new digital certificate from a remote server. The object comprises a request for the new digital certificate, validity scope information, and an address associated with a controlled access point through which the object is transmitted when requesting the new digital certificate. Thereafter, the object is sent to the remote server on a communication path that includes the controlled access point. Subsequently, the new digital certificate is received from the remote server after the remote server verifies the validity scope information and verifies that the object was transmitted through the address associated with the controlled access point.

12 Claims, 18 Drawing Sheets

METHOD AND SYSTEM FOR AUTOMATIC DISTRIBUTION AND INSTALLATION OF A CLIENT CERTIFICATE IN A SECURE MANNER

CROSS REFERENCE TO RELATED APPLICATIONS

This application relates to co-pending U.S. patent application Ser. No. 10/185,557, filed on Jun. 27, 2002, entitled "Remote Services System Relocatable Mid Level Manager" and naming Michael J. Wookey, Trevor Watson and Jean Chouanard as inventors, the application being incorporated herein by reference in its entirety.

This application relates to co-pending U.S. patent application Ser. No. 10/186,073, filed on Jun. 27, 2002, entitled "Remote Services System Communication Module" and naming Michael J. Wookey, Trevor Watson and Jean Chouanard as inventors, the application being incorporated herein by reference in its entirety.

This application relates to co-pending U.S. patent application Ser. No. 10/185,558, filed on Jun. 27, 2002, entitled "Bandwidth Management for Remote Services System" and naming Michael J. Wookey, Trevor Watson and Jean Chouanard as inventors, the application being incorporated herein by reference in its entirety.

This application relates to co-pending U.S. patent application Ser. No. 10/186,106, filed on Jun. 27, 2002, entitled "Remote Services System Service Module Interface" and naming Michael J. Wookey, Trevor Watson and Jean Chouanard as inventors, the application being incorporated herein by reference in its entirety.

BACKGROUND

It is known to provide a variety of services that are delivered remotely to a customer. These services range from point solutions delivering specific service to more complex remote service instantiations supporting multiple services. These services have a number of things in common: they are generally a good idea; they provide a valuable service to a set of customers; and, they are generally isolated from one another.

Communication over secure communication channels between the customer and the remote resources can be established using digital certificates. That is, digital certificates are widely used over communication networks and in the field of electronic commerce for document and identity authentication purposes. In general, such digital certificates are used to certify the identity of an entity (e.g., a customer). For instance, the customer can present an associated digital certificate to a resource providing remotely delivered services for identification to establish a secure communication channel between the customer and the resource.

Typically, the digital certificate is stored in a location on the local network associated with the customer. In this case, the digital certificate is exposed within the local network. As such, any person or entity with access to the local network also has access to the digital certificate. This presents a potential security breach. Any unauthorized person or entity having control of the digital certificate could perform unauthorized transactions on the part of the customer. As such, it is desirable to find a solution for storing a digital certificate that does not expose the digital certificate within the local network.

Moreover, the digital certificate authenticates the customer to the remote resource that provides services. If the digital certificate has been compromised and revoked, the customer may not have any channel to communicate with the remote resource. That is, since the digital certificate is compromised, the remote resource is unable to determine if the holder of the digital certificate is the true customer or someone posing as the customer. In this case, the customer does not have a way of identifying himself to the remote resource in order to obtain another digital certificate from the remote resource. As such, communication between the customer and the remote resource breaks down. As a result, it is desirable to find a solution for generating and transmitting a new digital certificate to a customer that is associated with a compromised digital certificate.

SUMMARY

Accordingly, various embodiments of the present invention are directed toward methods and systems for automatic distribution and installation of digital certificates in a secure manner.

In one embodiment, an object is used for requesting a new digital certificate from a remote server. The object comprises a request for the new digital certificate, validity scope information, and an address associated with a controlled access point through which the object is transmitted when requesting the new digital certificate. Thereafter, the object is sent to the remote server on a communication path that includes the controlled access point. Subsequently, the new digital certificate is received from the remote server after the remote server verifies the validity scope information and verifies that the object was transmitted through the address associated with the controlled access point.

It should be understood that the foregoing general description and the following detailed description are exemplary and explanatory only, and are not restrictive of the invention, as claimed.

DETAILED DESCRIPTION

Figure 1:
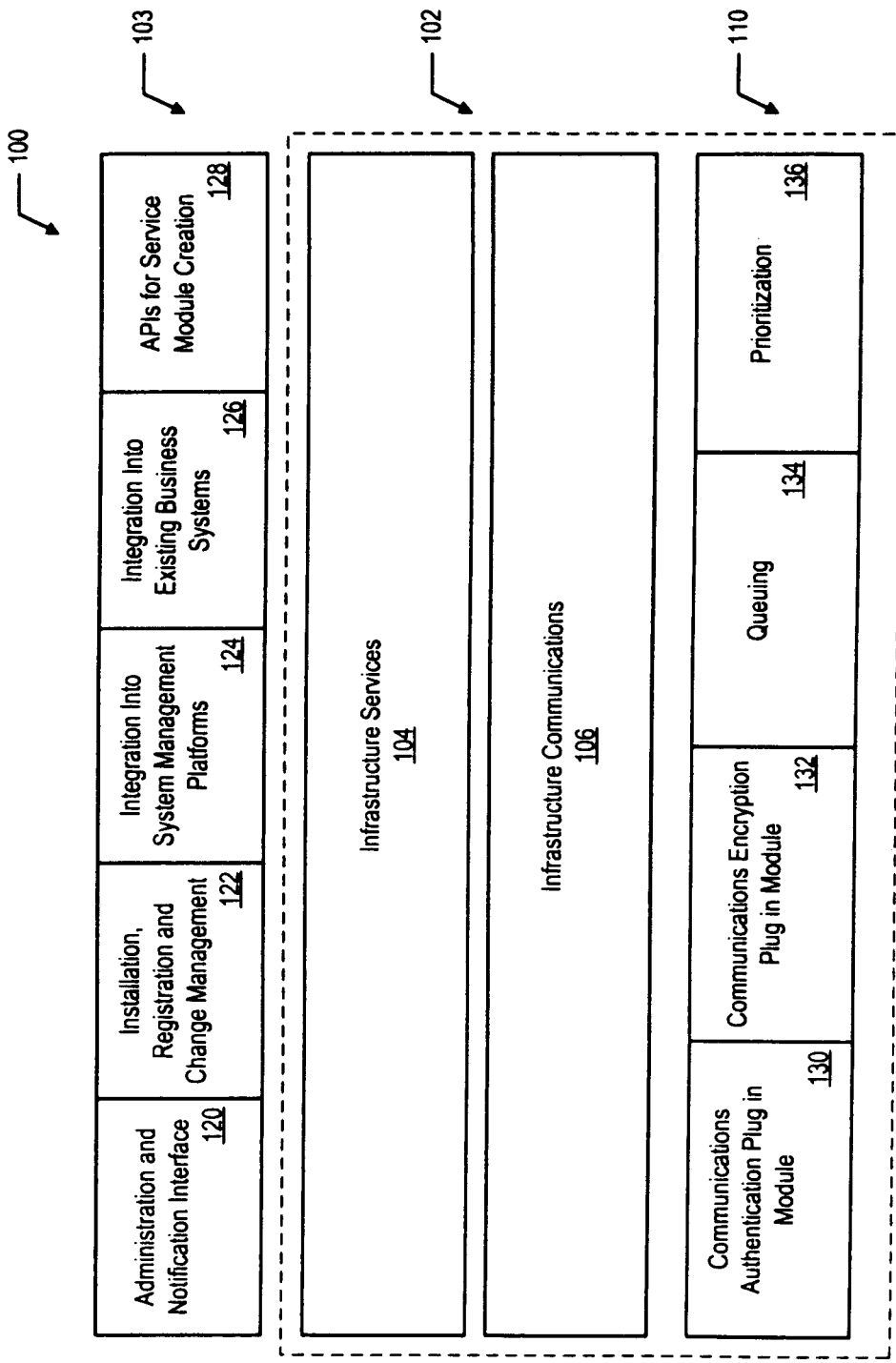
FIG. 1 shows a block diagram of a remote service delivery architecture.

Reference will now be made in detail to embodiments of the present invention, a method and system for distributing and installing digital certificates in a secure manner, examples of which are illustrated in the accompanying drawings.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "sending," "receiving," "limiting," "storing," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Embodiments of the present invention are comprised of computer-readable and computer-executable instructions which reside, for example, in computer-readable media of a computer system that is capable of recording kernel event data in a global buffer that is accessed through a hash table. That is, embodiments of the present invention can be implemented on software running on a computer system. The computer system can be an embedded system, a personal computer, notebook computer, server computer, mainframe, networked computer, handheld computer, personal digital assistant, workstation, and the like.

An exemplary computer system includes an internal address/data bus for communicating information, a processor coupled with the bus for processing information and instructions, a volatile memory (e.g., random access memory (RAM), static RAM dynamic RAM, etc.) coupled with the address/data bus for storing information and instructions for the processor, and a non-volatile memory (e.g., read only memory (ROM), programmable ROM, flash memory, EPROM, EEPROM, etc.) coupled to the address/data bus for storing static information and instructions for the processor. The computer system may also include various forms of data storage devices for storing information. The various components of a computer system maybe located remotely from one another and accessed via a network.

An optional network interface is coupled to address/data bus for providing a communication link between computer system and a network environment. As such, network interface enables the processor to communicate with browsers associated with clients that are coupled to the computer system. The computer system is coupled to a network using the network connection, network interface.

Other embodiments of the present invention are suitable for implementation within a client-server architecture, such as a thin client environment. A thin client is any computing device that enables users to perform computing tasks remotely, on a server. The thin client computing device provides minimal hardware within a processing environment. For example, the thin client environment provides a user with seamless access to all the applications and utilities they normally can use on their workstations or personal computers. However, the actual computing is performed on one or more remote servers. The thin client, or physical desktop unit, needs only enough memory and computing power to recognize keystrokes and mouse events, and to display pixel data received from the remote server. Typically, no computing is performed locally. However, the computing is performed on one or remote servers. As such, the computer system 100 can be modified both to represent the thin client side with minimal hardware to access the remote server, such as a monitor keyboard, mouse, and built in smart card readers. In addition, the computer system 100 can be modified to represent the remote server side in a client-server architecture.

Remote Services Architecture Including Mid Level Managers

FIG. 1 shows a block diagram of an architecture for a remote service delivery system 100 that meets the needs of both the service provider and the customer. The architecture of the present invention is modularized to provide broad support for both the customer and the service provider in terms of evolution of service functionality to the architecture and within the architecture.

The architecture is broadly comprised of the remote service infrastructure 102, a group of service modules 103 and a plurality of communications modules 110. The remote services infrastructure 102 provides reliable remote service delivery and data management. The remote services infrastructure 102 supports the needs of a service creator by focusing the service creator on the needs and the design of the service by eliminating the need for the service creator to be concerned about how data is transferred and managed to and from a customer site.

The remote services infrastructure 102 provides an interface to support the development of services that use a set of common service parameters to develop customized services for a specific service provider or customer. The infrastructure 102 is separately segmented from, but actively interacts with, the service modules 103.

Within the group of software modules 103 are individual software modules that analyze data collected by the remote services infrastructure 102 and provides service value based on that data to a customer. Thus, the remote services infrastructure 102 and the service modules 103 can be differentiated as follows: the remote services infrastructure 102 is concerned with how data is collected, while the service module 103 is concerned with what is done with the data.

The remote services infrastructure 102 includes an infrastructure services portion 104 and an infrastructure communications portion 106. The infrastructure services portion 104 interacts with the plurality of service modules 103, as described in greater detail below. The remote services infrastructure 102 provides a set of application program interfaces (API's) that are used by a service module developer to leverage common services of the infrastructure such as database access, software delivery and notification services. The infrastructure communications portion 106 includes a plurality of communications modules 110.

The infrastructure services portion 104 interacts with a plurality of service modules 103. Examples of service modules that the remote services architecture may include are an administration and notification interface module 120, an installation, registration and change management module 122, an integration into system management platforms module 124, an integration into existing business systems module 126 and an API's for service module creation module 128. The administration and notification interface 120 allows a customer and service provider to control the remote services infrastructure. The installation, registration and change management module 122 supports the infrastructure and service modules deployed on top of the infrastructure. The module 122 may include automatic registration of new software components, delivery of software and detection of changes within an environment. The integration into systems management platforms module 124 provides an integration point to systems management platforms in general. The integration into existing business systems module 126 allows the remote services infrastructure 102 to integrate into existing business systems to leverage data, processing capacities, knowledge and operational process. The module 126 allows the infrastructure 102 to integrate into the required business systems and provides interfaces to the service module creator to use those systems. The API's for service module creation module 128 allows a service module creator to abstract the complexity of remote data management. The module 128 provides an API of abstracted services to the service module creator.

The infrastructure communications portion 106 provides an abstraction of different protocol and physical network options. Examples of protocol options include an HTTP protocol and an email protocol. Examples of physical network options include Internet based communications, private network based communications and fax communications. The different protocol and physical network options are provided to meet the needs of as many customers as possible.

The infrastructure communications portion 106 supports a number of plug-in communications modules 110. Examples of the communications modules 110 include a communications authentication module 130, an encryption module 132, a queuing module 134, and a prioritization module 136. The communications authentication module 130 is related to the communications protocol that is used and provides the customer with authentication of a communication session. The encryption module 132 is related to the protocol being used and provides encryption of the data stream. The queuing module 134 provides the ability of the infrastructure to queue data being sent through the infrastructure to provide data communications integrity. The prioritization module 136 provides the ability for data within the system to be prioritized for delivery.

Figure 2:
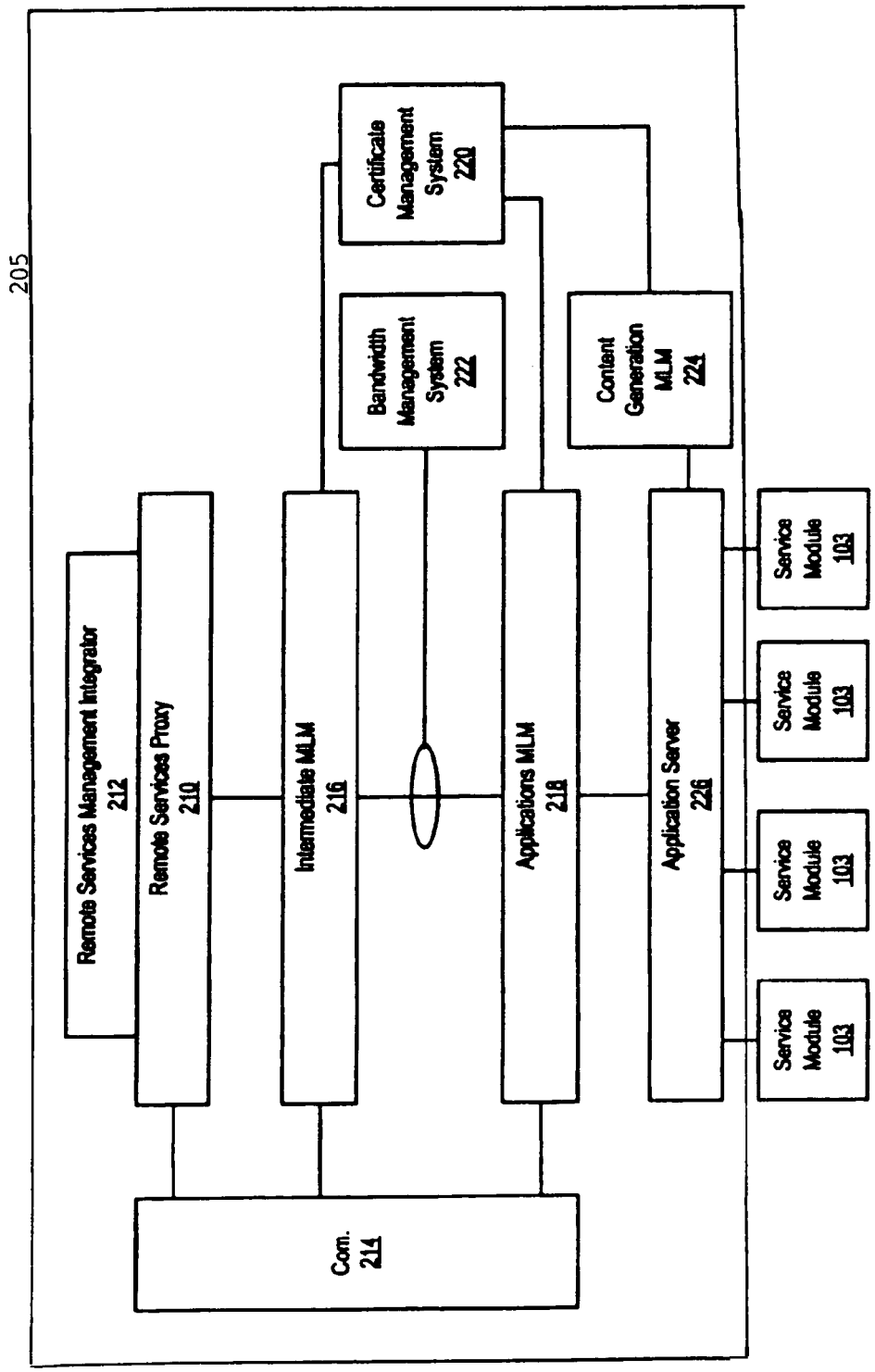
FIG. 2 shows a schematic block diagram of the components relating to the remote services infrastructure.

Referring to FIG. 2, the remote services infrastructure architecture 205 includes a plurality of components. More specifically, the remote services infrastructure architecture 205 includes a remote services proxy 210, a remote services system management integrator 212, a remote services communications module 214, an intermediate mid level manager (MLM) 216 (which may be a customer MLM or an aggregation MLM), an applications MLM 218, a certificate management system 220, a bandwidth management system 222, a remote services content generation MLM 224, a remote services application server 226. The remote services infrastructure architecture 205 interacts with a plurality of external service modules 103.

The remote services proxy 210 provides an API to the systems management systems. This API supports data normalization to the remote services data format. The remote services proxy 210 also provides receptors for the communications modules and in turn provides communications flow management using queuing. The remote services proxy 210 also manages allocation of remote services identifiers (ID's), which are allocated to each component of the remote services infrastructure, and the support instances that are registered with the remote services system.

The remote services system management integrators 212 are written to a remote services integrator API supported by the remote services proxy 210. One remote services proxy 210 can support many integrators (also referred to as integration modules). The integration modules provide the glue between the remote services system and the systems management platform. There is at least one integration module for each support systems management platform.

The remote services communications modules 214 provide protocol, encryption and communications authentication. These modules plug-in through a semi-private interface into the remote services proxy 210, the intermediate MLM 216 and the remote services application MLM 218.

The intermediate MLM 216 may be either a customer MLM or an aggregation MLM. The remote services customer MLM is an optional deployable component. The remote services customer MLM provides a higher level of assurance to the customer-deployed environment, providing transaction integrity, redundancy and data queue management. The remote services customer MLM also provides an extensible environment through an API where service module components can be deployed. When no customer MLM is deployed, the aggregation MLM, hosted by the remote services provider and handling multiple customers, provides the data queue management, transaction integrity and redundancy. While the customer MLM is very similar to an aggregation MLM, a customer MLM may be required by a service module that needs to be localized. An aggregation MLM, being shared by multiple customers, may not be customizable.

The applications MLM 218 provides a series of functions that can exist on different MLM instantiations as applicable. The applications module provides data normalization, integration with the mail server data flow and integration with the certificate management system 220. This module acts as the gateway to the remote services application server 226 and controls data access.

The certificate management system 220 provides management of certificates to verify connection authentication for the remote services system 100. The certificate management system 220 may be horizontally scaled as necessary to meet the load or performance needs of the remote services system.

The bandwidth management system 222 provides control over bandwidth usage and data prioritization. The bandwidth management system 222 may be horizontally scaled as necessary to meet the load or performance needs of the remote services system.

The remote services content generation MLM 224 provides HTML content based on the data held within the remote services application server 226. This module provides a high level of HTML caching to reduce the hit rate on the application server for data. Accordingly, visualization of the data is done through the content generation MLM 224. Separating the visualization processing in the content generation MLM 224 from the data processing in the applications server 226 provides two separate scale points.

The remote services application server 226 provides the persistent storage of remote services infrastructure information. The application server 226 also provides the data processing logic on the remote services infrastructure information as well as support for the service module AFI to create service module processing within the application server 226. The application server 226 provides access to directory services which support among other things, IF name lookup for private network IF management. The application server 226 also provides access to the service modules 103.

In operation, the remote services proxy 210 uses the communication module 214 to connect to the intermediate MLM 216, whether the intermediate MLM is a customer MLM or an aggregation MLM. The applications MLM 218 and the intermediate MLM 216 use the certificate management system 220 to validate connections from customers. Dataflow bandwidth between the intermediate MLM 216 and the applications MLM 218 is controlled by the bandwidth management system 222. Data that has been formatted by the applications MLM 218 is sent on to the application server 226 for processing and persistent storage.

The content generation MLM 224 provides visualization and content creation for users of the remote services system. Remote services infrastructure administration portal logic is deployed to the content generation MLM 224 to provide users of the remote services system with the ability to manage the remote services system.

All of the remote services components are identified by a unique remote services identifier (ID). A unique customer remote services ID is generated at customer registration. For remote services infrastructure components, remote services ills are generated, based on the customer remote services ID, at a component registration phase. For remote services entities reporting to a remote services proxy 210, such as a support instance or an integration module, the remote services ID is allocated by the proxy 210 itself, based on the remote services ID of the proxy 210.

Within the remote services architecture, there are instances where detection, collection and management logic (also referred to as systems management logic) may have already been created by another service module. In this instance, the service module creator reuses this functionality. The reuse then creates a more complex relationship within the system to be managed. The segmentation and re-use of data is available within the architecture. Instrumentation is made up of a large number of small data types. These data types are shared by the different service modules 103 using a publish and subscribe model.

Figure 3:
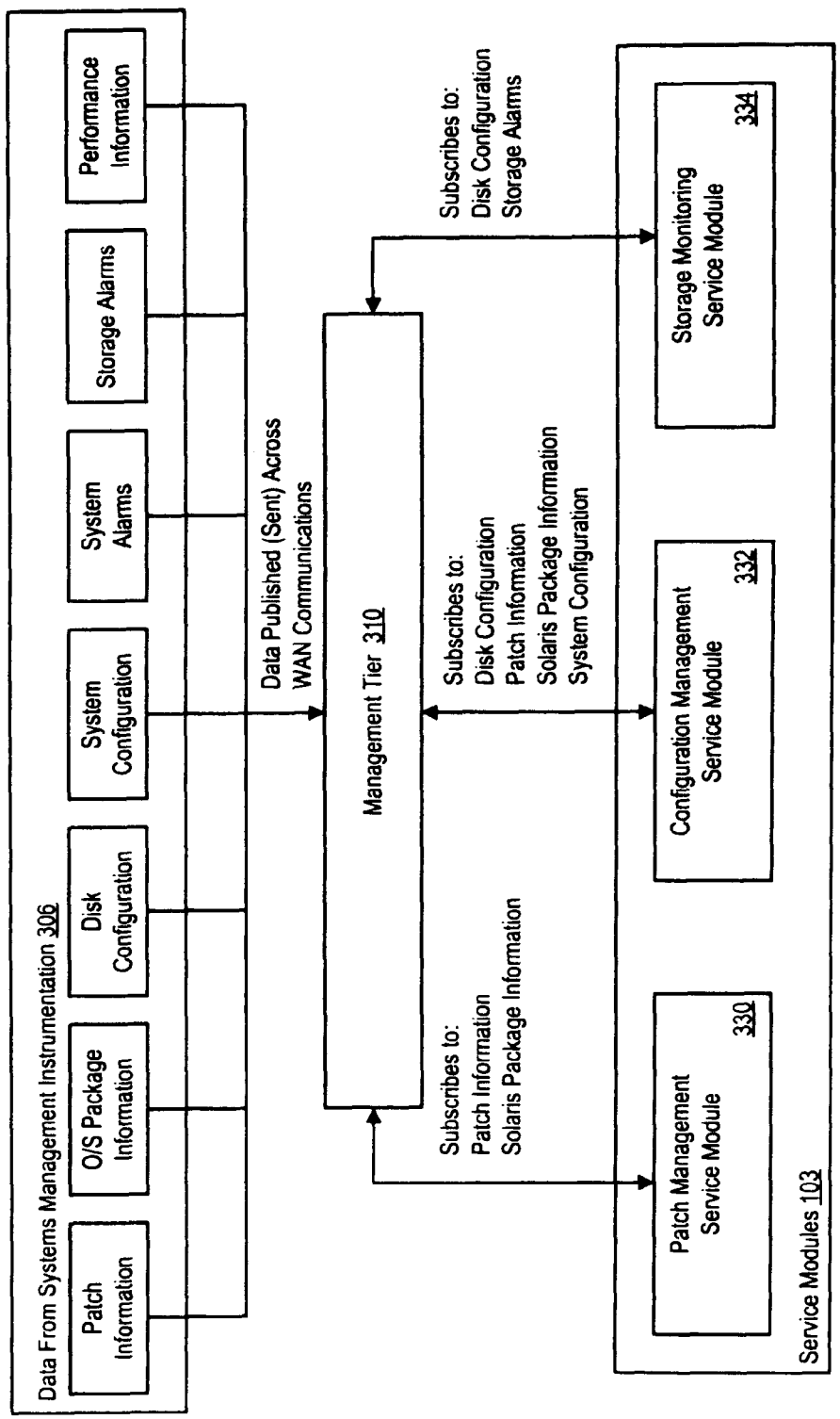
FIG. 3 shows a publish and subscribe example using the remote services delivery architecture.

In a publish and subscribe model, the remote services proxies (and therefore the systems management systems) publish their data to a service provider. The service modules 103 register interest in specific types of data that are needed to fulfill the respective service module processing. FIG. 3 provides an example of the publish and subscribe model using example data and services.

More specifically, data from a systems management instrumentation proxy 306 may include patch information, operating system package information, disk configuration information, system configuration information, system alarms information, storage alarms information and performance information. This information is published via, e.g., a wide area network (W AN) to a management tier 310. Various service modules 103 then subscribe to the information in which they are respectively interested. For example, a patch management service module 330 might be interested in, and thus subscribe to, patch information and operating system package information. A configuration management service module 332 might be interested in, and thus subscribe to, the disk configuration information, the patch information, the operating system package information and the system configuration information. A storage monitoring service module 334 might be interested in, and thus subscribe to, disk configuration information and storage alarms information.

Thus, with a publish and subscribe model, many different types of data are published by a customer using the remote services customer deployed infrastructure. Service modules then subscribe to these data types. More than one service module 103 can subscribe to the same data. By constructing the instrumentation data in a well segmented manner, the data can be shared across many services.

Sharing data across many services reduces duplication of instrumentation. By making data available to newly developed service modules, those service modules need to only identify instrumentation that does not exist and reuse and potentially improve existing instrumentation. Sharing data across multiple services also reduces load on customer systems. Removing the duplication reduces the processing load on the customer's systems. Sharing data across multiple services also reduces development time of service modules 103. As more instrumentation is created and refined, service modules 103 reuse the data collected and may focus on developing intelligent knowledge based analysis systems to make use of the data.

Accordingly, the separation and segmentation of the infrastructure from the service modules enables services to be created in a standardized manner ultimately providing greater value to the customer.

Figure 4:
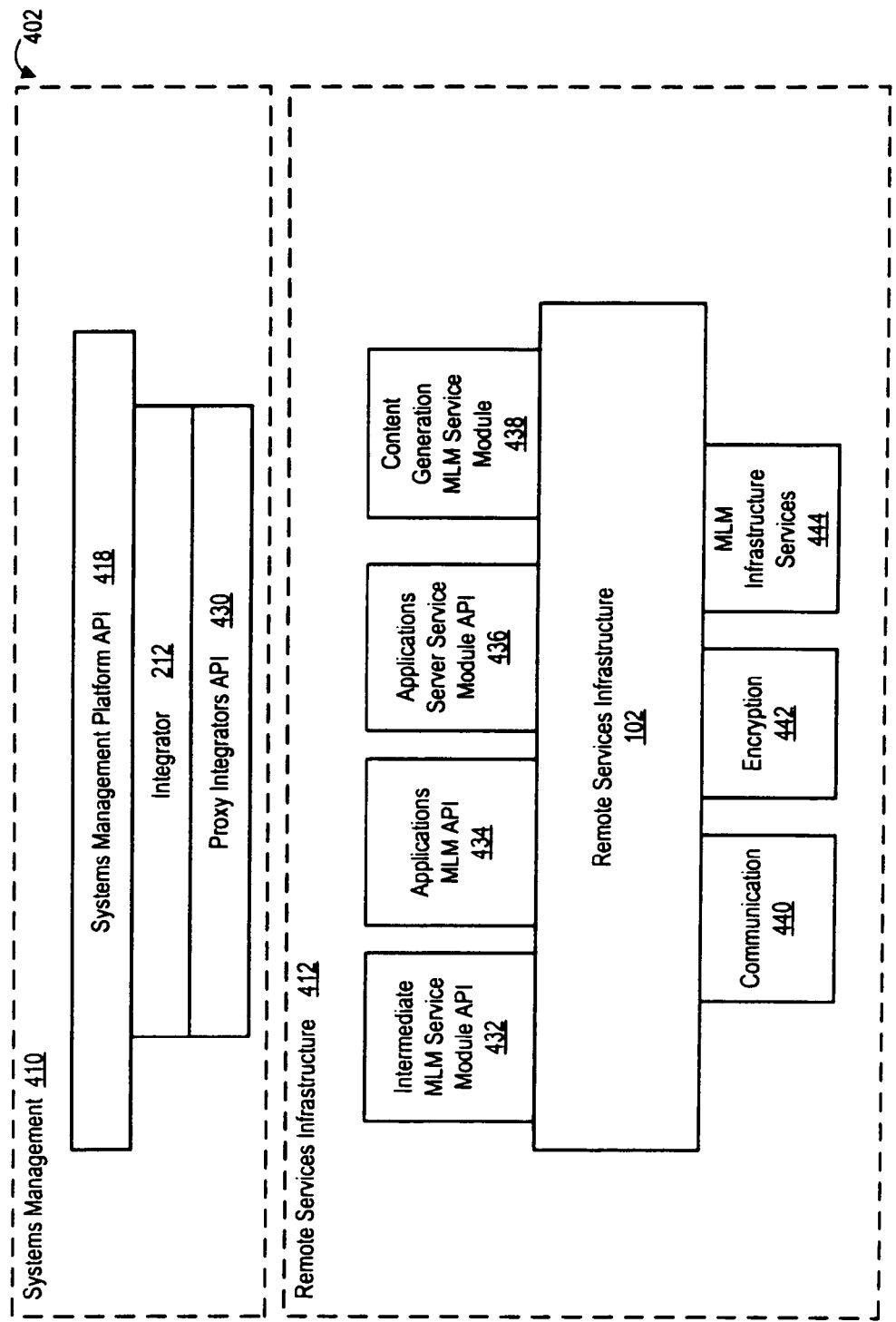
FIG. 4 shows a block diagram of the application program interfaces (API's) of the remote service delivery architecture.

Referring to FIG. 4, the remote services architecture includes a remote services API 402 which may be conceptualized in two areas, systems management API's 410 and remote services infrastructure API's 412.

The systems management API's 410 includes systems management API's 418, integrator 212 and proxy integrators API 430. The proxy integrator API 430 interfaces with integrator module service logic. The integrator module service logic is a general term for the configuration rules that are imparted on the systems management system to collect or detect the information for the integrator 212. While the proxy integrator API's 430 are not technically apart of the remote services system, the proxy integrator API 430 is used within the integration modules which form the boundary between the remote services system and the system management. The integration module creator provides the instrumentation to fulfill the collection and detection needs of the service via the systems management API 418.

The proxy integrators API 430 provides an interface between the systems management system and the remote services infrastructure 102. This interface provides a normalization point where data is normalized from the system management representation to a remote services standard. By normalizing the data, the remote services system may manage similar data from different systems management systems in the same way. The proxy integrators API 430 interfaces with the remote services proxy as well as the systems management integrator 212.

The remote services infrastructure API's are used by a service module creator and the systems management integrator 212. The remote services infrastructure API's 412 include an intermediate MLM Service Module API 432, an applications MLM API 434 and an applications server service module API 436 as well as a content generation MLM service module API 438. These API's provide the interface with the remote services infrastructure 102.

The intermediate MLM Service Module API 432 describes a distributed component of the infrastructure. The intermediate MLM service module API 432 allows modules to be loaded into this distributed component that provides mid data stream services such as data aggregation, filtering, etc. The intermediate MLM service module API 432 provides access and control over the data that flows through the intermediate MLM 216 to the service module provider. The intermediate MLM service module API 432 allows intercept of data upstream and on the back-channel to mutation, action and potential blocking by the service modules. The intermediate MLM service module API 432 interfaces with a service module creator as well as with the intermediate MLM 216 and intermediate MLM based service modules.

The applications MLM API 434 allows additional modules to be loaded on the applications MLMs. The applications MLM API 434 allows modules to be built into the applications MLMs such as data normalization. The applications MLM API 434 interfaces with the applications MLMs and modules within the applications MLM.

The applications server service module API 436 provides all of the needs of a data processing service module. The applications server service module API 436 provides access to many functions including data collected through a database and access to a full authorization schema. The applications service module API 436 is based around the J2EE API. The applications service module API 436 provides a rich interface for service module creators to interact with and build services based on Enterprise Java Beans (EJB's) and data available to them. The application server service module API 436 interfaces with the remote services application server and the service modules.

The content generation MLM API 438 is based around the J2EE web container and provides the service module creator a way of building a browser based presentation. The content generation API interfaces with the content generation MLM as well as with MLM generation based service modules.

The remote services infrastructure API's 412 also include a plurality of communication interfaces which are based around the extendibility of the remote services communications system. The communication interfaces include a communication protocol module 440, a communication encryption module 442 and an MLM infrastructure services portion 444. The communications interfaces interface with the remote services proxy as well as all of the remote services system MLM's. The communications interfaces provide an interface between the communications modules and the components that use the communications modules.

The communications protocol module 440 provides support of the application level protocol that is used for the communication through the system. Modules of this type interface to support the use of Email and HTTP communications protocols. The communication protocol module 440 interfaces with remote services communications engineering personnel.

The communications encryption module 442 supports plug-in encryption modules. The plug-in encryption modules can either provide encryption at the protocol level or encryption of the data within the protocol. The communication encryption module 442 interfaces with remote services communications engineering personnel.

The MLM infrastructure services portion 444 represent a number of services that are included within the MLM that provide services that are relevant to the infrastructure 102. These services manage and manipulate the data as it passes through the different parts of the architecture. These services, such as queuing, utilize an API to access and manipulate the API.

Figure 5A:
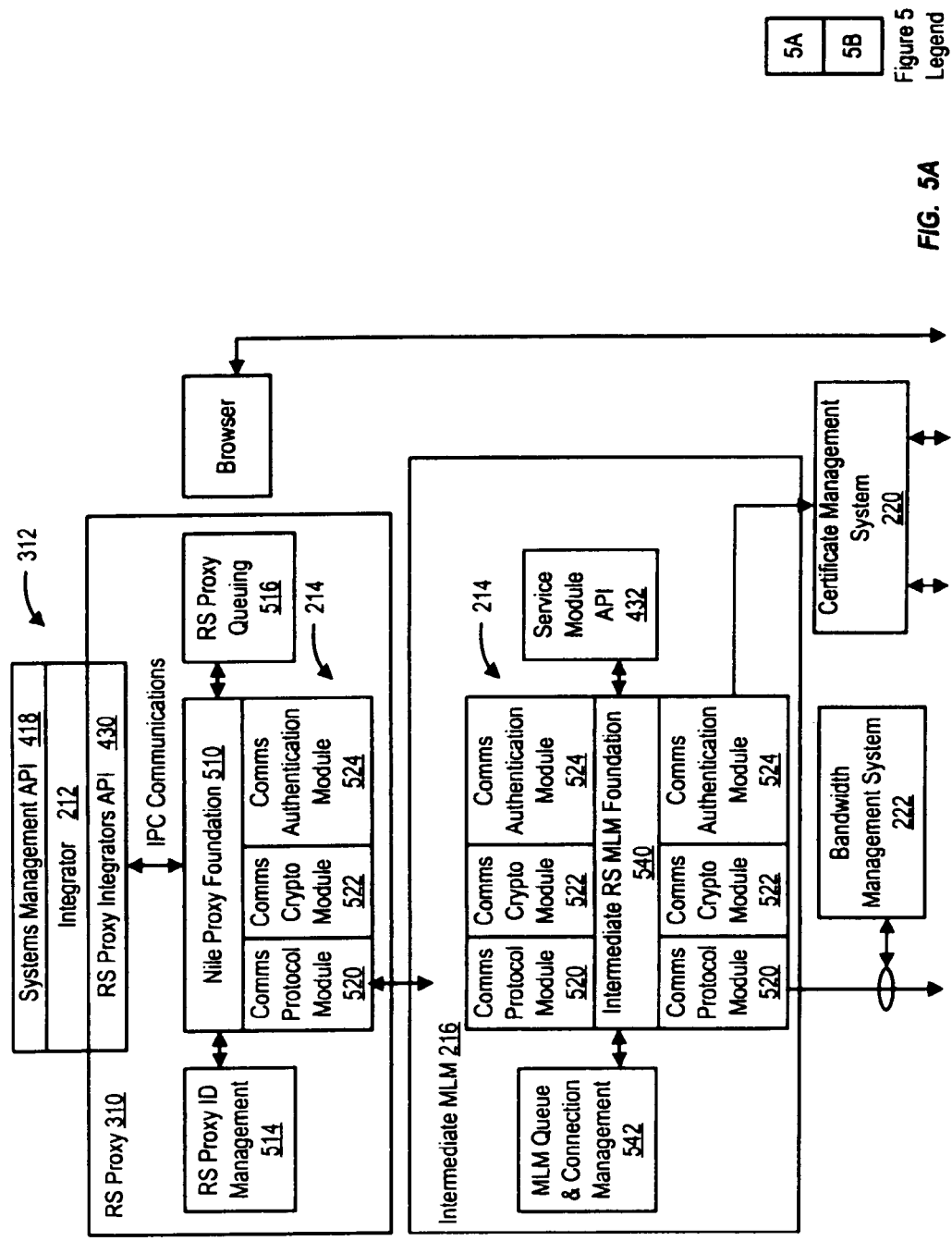
FIGS. 5A and 5B show a more detailed version of the components of FIG. 2.
Figure 5B:
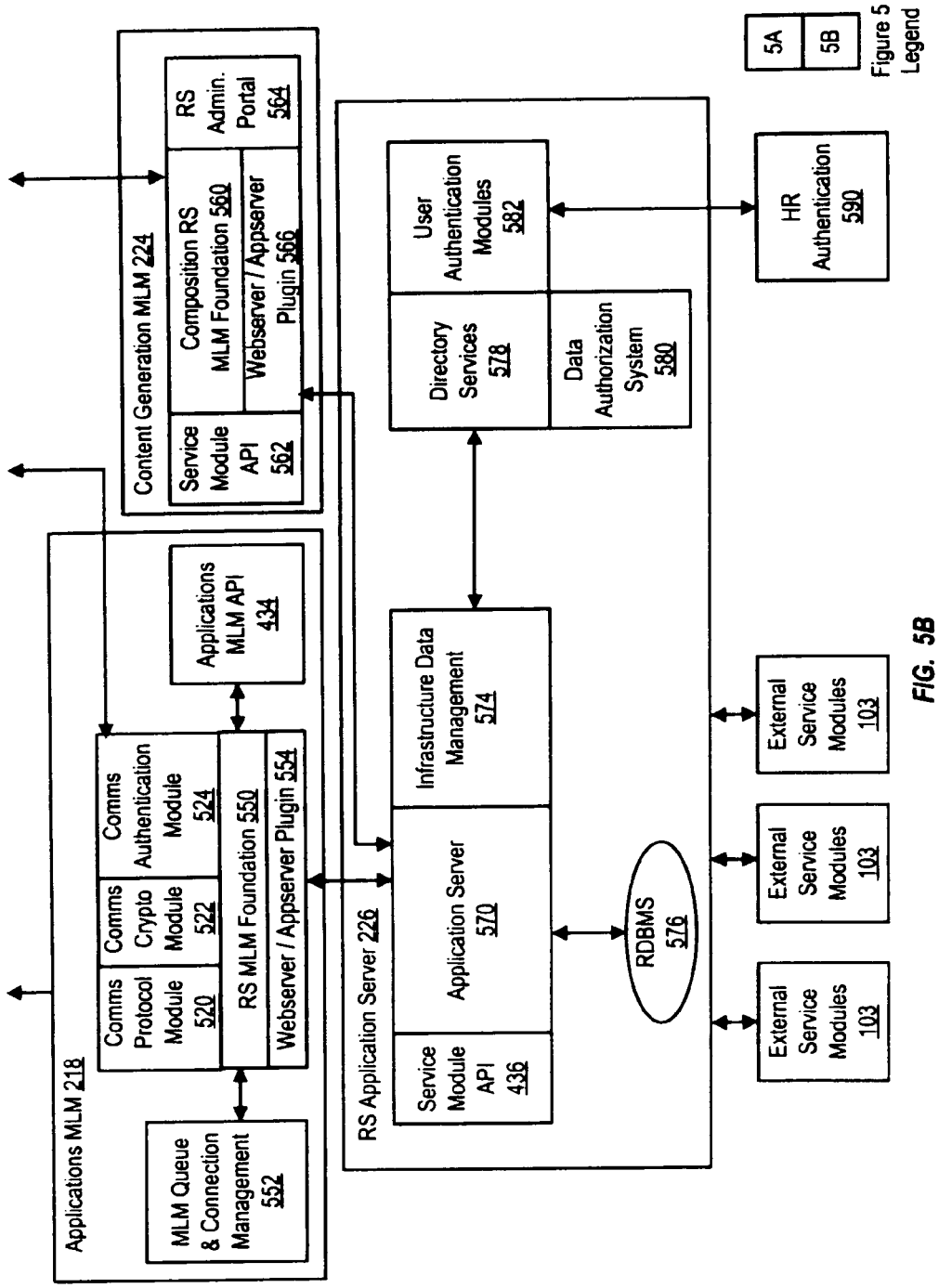

FIGS. 5A and 5B show a more detailed block diagram of the remote services architecture depicted in FIG. 2. Within this more detailed block diagram, the remote services communications modules 214 are shown distributed across the remote services proxy 210, the intermediate MLM 214 and the applications MLM 218.

The remote services proxy 210 includes a remote services proxy foundation module 510 which is coupled to a communications module 214 as well as to a remote services proxy integrator API module 430, a remote services proxy ID management module 514 and a remote services proxy queuing module 516.

The remote services system management integrator 212 includes a systems management API 418 and a remote services integrator 212. The remote services integrator 212 is coupled to the remote services proxy integrators API module 430 of the remote services proxy 210.

Each communication module 214 includes a communications protocol module 520 and a communications crypto module 522. A communications module 214 may also include a communications authentication module 524.

The intermediate MLM 216 includes an intermediate remote services MLM foundation module 540 which is coupled between communication modules 214. The intermediate remote services MLM foundation module 540 is also coupled to a MLM queue and connection management module 542 and an intermediate service module API module 432. Communications modules 214 couple the intermediate MLM 216 to the remote services proxy 210 and the applications MLM 218.

Bandwidth management system 222 controls bandwidth usage and data prioritization on the communications between intermediate MLM 216 and applications MLM 218. Certificate management system 220 is coupled between the communications authentication modules 524 for the intermediate MLM communications module 214 and the applications MLM 218 communications module 214.

The applications MLM 218 includes a remote services MLM foundation module 550 that is coupled to the communications module 214 for the applications MLM 218. The remote services MLM foundation module 550 is also coupled to an MLM queue and connection management module 552 and the applications MLM API module 434 as well as a web server application server plug-in module 554.

Content generation MLM 224 includes a composition MLM foundation module 560. The composition MLM foundation module 560 is coupled to a service content generation module API module and a remote services administration portal 564 as well as a web server application server plug-in module 566.

Remote services application server 226 includes an application server module 570 coupled to an application server service module API 436 and an infrastructure data management module 574. The application server module 570 is also coupled to relational database management system (RDBMS) 576. The infrastructure data management module 574 is coupled to a directory services module 578. The directory services module 578 is coupled to a data authorization system module 580 and user authentication modules 582. The user authentication modules 582 are coupled to human resources (HR) authentication module 590. The remote services application server 226 is coupled to a plurality of external service modules 103.

FIGS. 6, 7, 8, 9 and 10 show expanded views of the remote services proxy 210 and remote services system management integrator 212, intermediate MLM 216, applications MLM 218, applications server 226 and content generation MLM 224, respectively.

Figure 6:
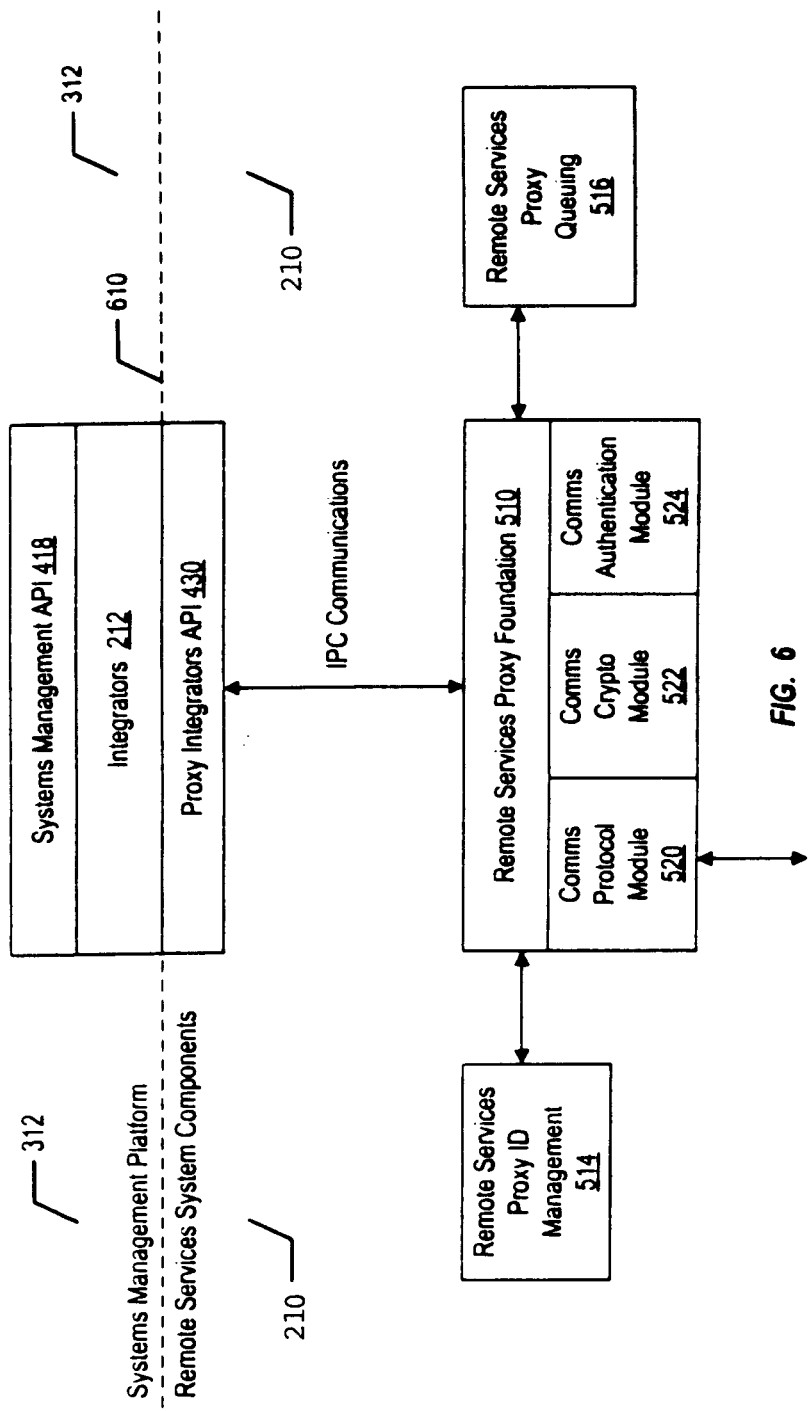
FIG. 6 shows a block diagram of a remote services proxy and a remote services system management integrator.

FIG. 6 shows a block diagram of the remote services proxy 210 and the remote services system management integrator 212. The block diagram shows the delineation between the systems management software and the remote services system components as indicated by line 610.

The remote services proxy 210 provides an API via remote services proxy integrators API 430 which communicates using the operating system's Inter-Process Communication (IPC) implementation with the remote services proxy foundation module 510. This communication allows the API to be implemented with a number of different languages to meet the needs of the systems management developers while leaving a single native implementation of the remote services proxy foundation module 510. Examples of the languages used for the API include Java and C++.

The remote services proxy foundation module 510, together with the API 430, manage data normalization tasks. This ensures that systems management data is carried independently through the system. For example, an event from one type of service, such as a SunMC service, would have the same structure as an event from another type of service, such as the RASAgent service. Accordingly, the service modules may deal with the data types that are specific to the respective service and are independent of their source.

In the remote services architecture, the integrator 212 and proxy 210 are represented by two separate processes (e.g., address spaces). By representing the integrator 212 and the proxy 210 as two separate processes, a faulty integrator 212 is prevented from taking down the whole proxy 210.

The remote services proxy queuing module 516 allows data to be queued for transmission when communications to the intermediate MLM(s) become unavailable. This queuing is lightweight and efficient which in turn reduces the capabilities of length of time data can be queued and of reconnection management. The remote services proxy queuing module 516 provides a number of features that can be used to manage the queue, such as priority and time for data to live.

The remote services proxy ID management module 514 manages the allocation of unique identifiers for the proxy 210 itself and any support instances that are registered through the API. The remote services system relies on the creation of unique ID's to manage individual support instances. This function is provided within the proxy 210 because there is no unique cross platform identifier available within the remote services system. The proxy 210 manages the mapping between the systems management ID (e.g., IP address) and the remote services ID, which is keyed off the unique customer ID provided at installation time within the deployed system.

Figure 7:
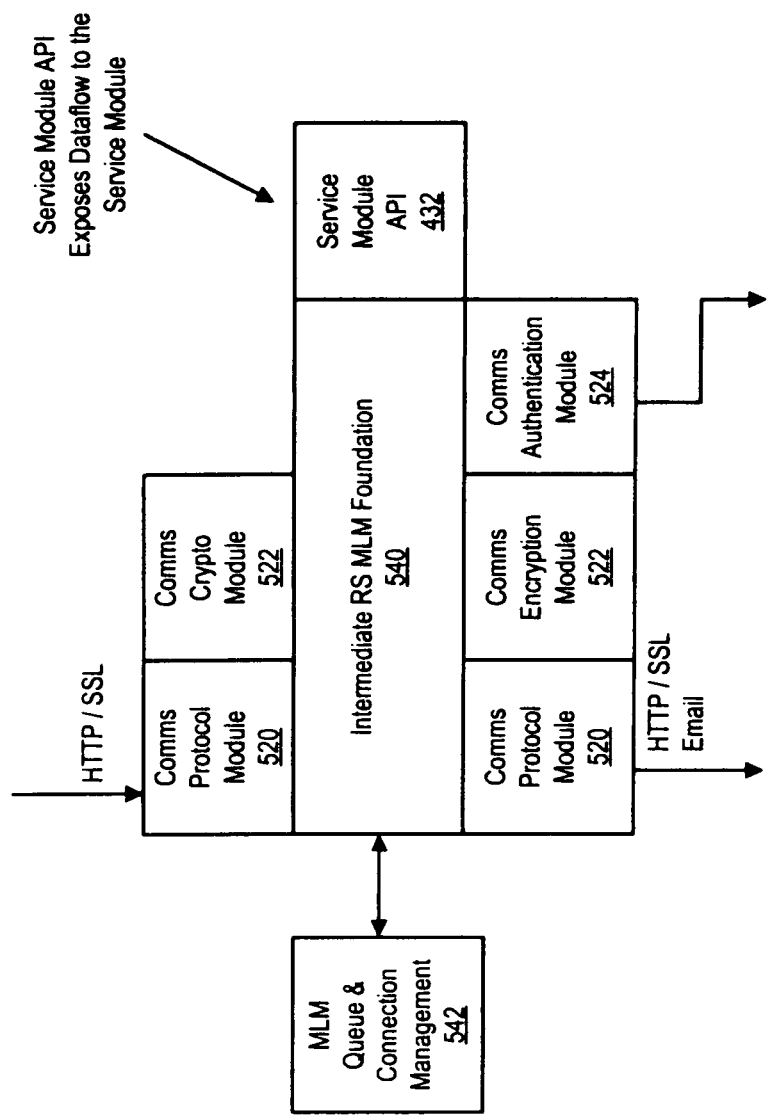
FIG. 7 shows a block diagram of a remote services intermediate mid level manager (MLM).

FIG. 7 shows a block diagram of the remote services intermediate MLM. The intermediate MLM may be a customer MLM or an aggregation MLM.

The customer MLM is an optional component that can be deployed to support scaling of both support instances and services as well as provide enhanced availability features for a deployed remote services environment. The intermediate MLM receives information via the HTTP protocol from the remote services proxy. This information may optionally be encrypted. Connections are not authenticated by default on the server side, as it is assumed that the connection between the intermediate MLM and the proxy is secure.

The intermediate remote services MLM foundation module 540 exposes the data flow to the service module API 432 where registered service modules can listen for new data of specific types and mutate the data as required. Examples of this function include filtering of certain types of data or data aggregation. The customer MLM does not keep state from an infrastructure perspective. However, the service module could choose to keep persistent state information. The recoverability fail-over support of that state, however, is in the domain of the service module, although the basic session replication features that provide the redundancy features of the infrastructure data flow may be reused.

The queue and connection management module 542 provides a highly reliable secure connection across the wide area network to the service provider based MLM farms. The queue manager portion of module 542 also manages back-channel data that may be intended for specific remote services proxies as well as for the applications MLM itself.

The intermediate remote services MLM foundation module 540 manages the rest of the MLM's roles such as session management, fail-over management and shared queuing for the back-channel.

Aggregation MLM's, while provided by the service provider, function much the same as customer MLM's. Strong security is turned on by default between such MLM's and the remote services proxy. Accordingly, a communications authentication module 524 is used on the receiving portion of the intermediate MLM.

Figure 8:
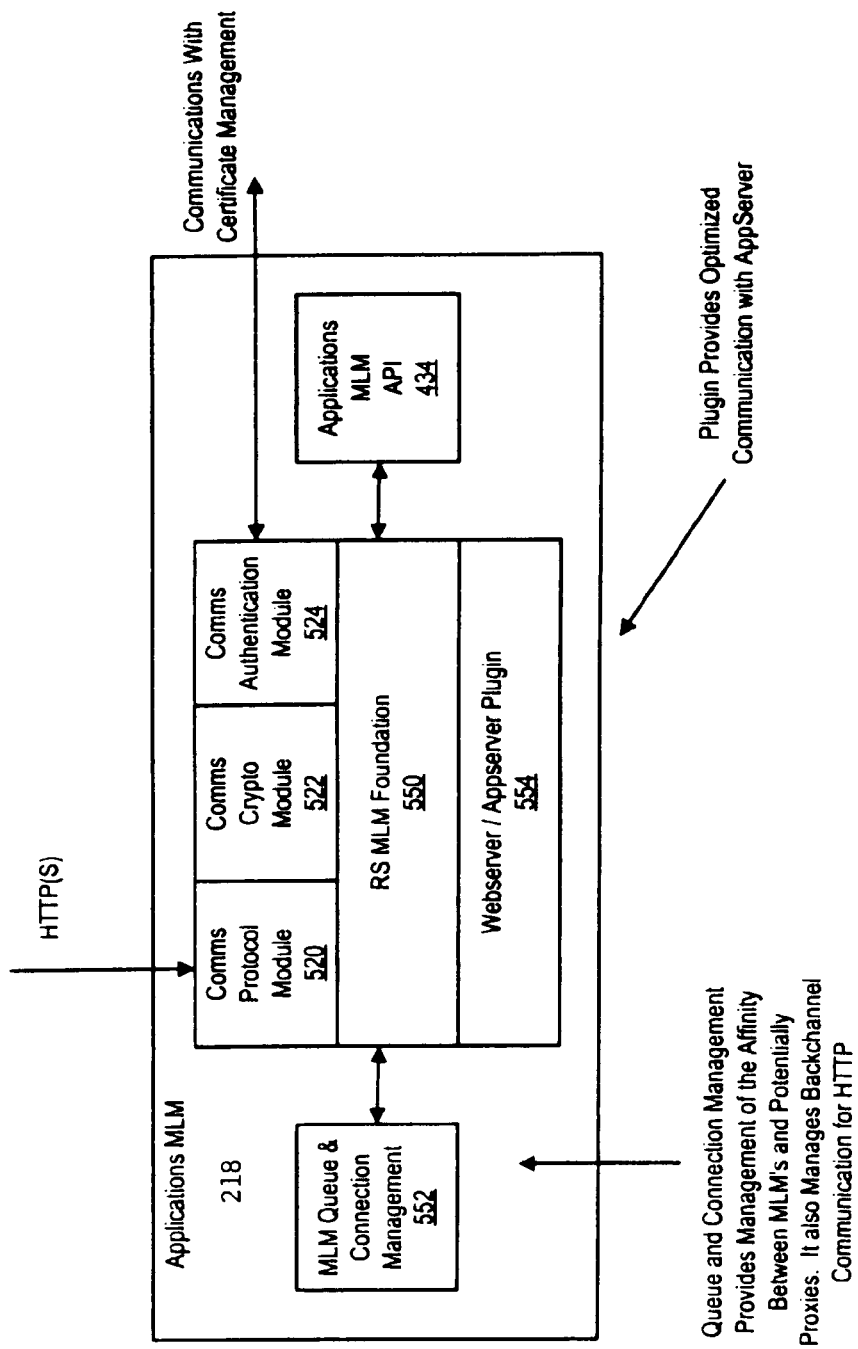
FIG. 8 shows a block diagram of a remote services applications MLM.

Referring to FIG. 8, the remote services application MLM 218 provides several functions (applications) for the remote services system. The remote services application 218 hosts applications as well as functioning as a content creation MLM. The host applications within the application MLM 218 include data normalization, customer queue management and remote access proxy. The data normalization application supports normalization and formatting of data being sent to the application server. The customer queue management application handles general connections to and from customer remote services deployments. The customer queue management application also manages back-channel requests and incoming request. The remote access proxy application provides a remote access point as well as functioning as a shared shell rendezvous point. The applications MLM 218 uses the application server plug-in to communicate directly with the application server.

The communications authentication module 554 communicates with the certification management system to validate incoming connections from customers. Each customer is provided a certificate by default although more granular allocations are available. Certificates are distributed at installation time as part of the installation package for both the remoter services proxy module and for the remoter services customer MLM.

Figure 9:
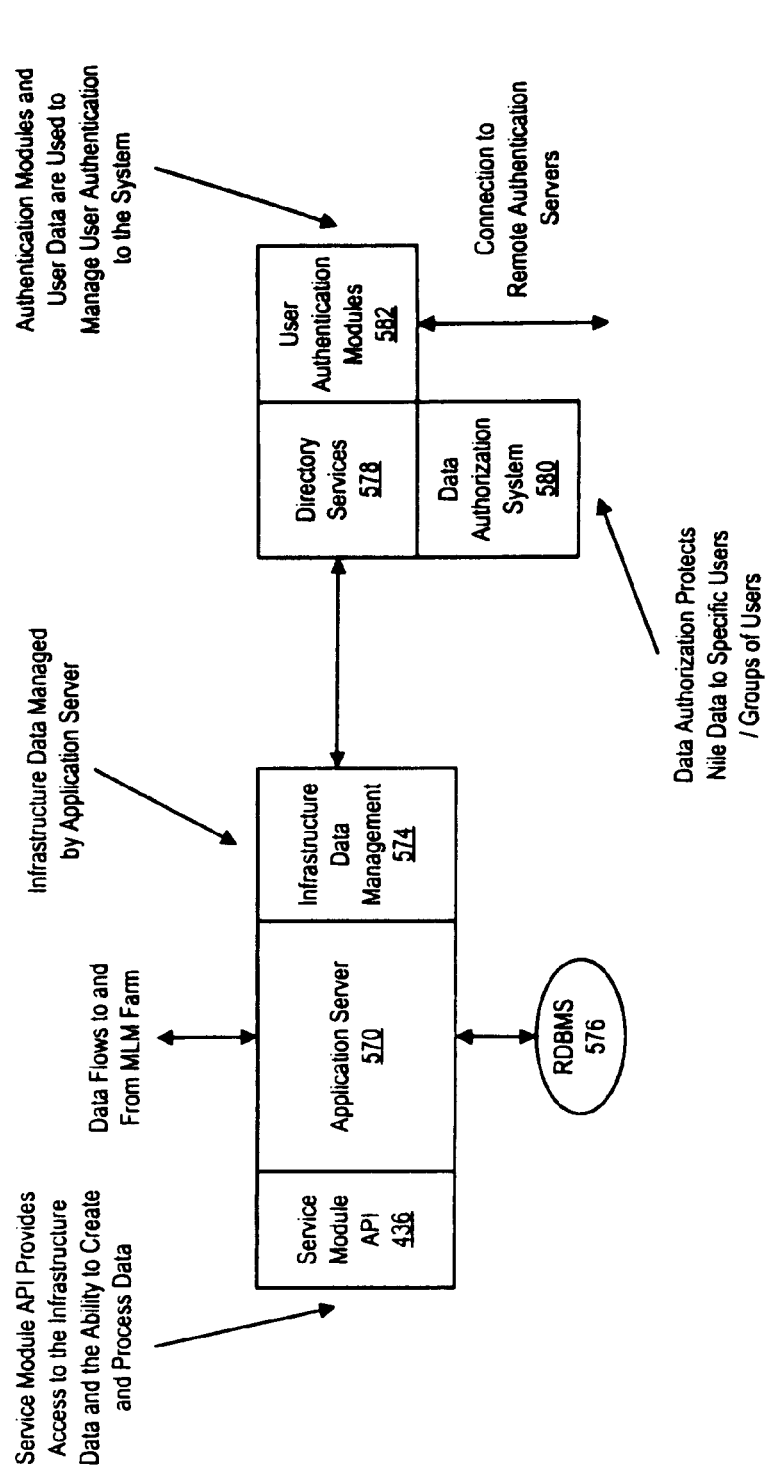
FIG. 9 shows a block diagram of an application server module.

Referring to FIG. 9, the application server 226 manages the persistence and data processing of the remote services infrastructure and the service modules.

The application server 226 provides the core service module API 436 to the service module creator. The service module API 436 is based upon the J2EE API. The service module API 436 allows the service module creator to register for certain types of data as the data arrives and is instantiated. This data can then be processed using the support of the application server 226 or alternatively exported from the remote services system for external processing.

The infrastructure data is held within the application server 226 and stored within the RDBMS 576 associated with the application server 226. Access to this data is available via the service module API 436 and is managed via the infrastructure data management module 574.

The directory services implementation supports user authentication, data authorization and private network data support. User authentication uses a pluggable authentication module (PAM) so support a plurality of authentication methods such as a lightweight directory assistance protocol (LDAP) method for service provider employees and a local login method for a remote services based login schema. Other methods may be added. The LDAP login is processed using a replicated copy of an LDAP server running within the remote services infrastructure.

Data authorization is designed to protect the data held within the application server 226 to specific groups of users. This protection allows customers to grant or deny access to their service data to specific users. This data protection is managed down to the service module granularity. So for example, a customer could grant information about advanced monitoring on a subset of their support instances to members of a service provider monitoring staff.

Figure 10:
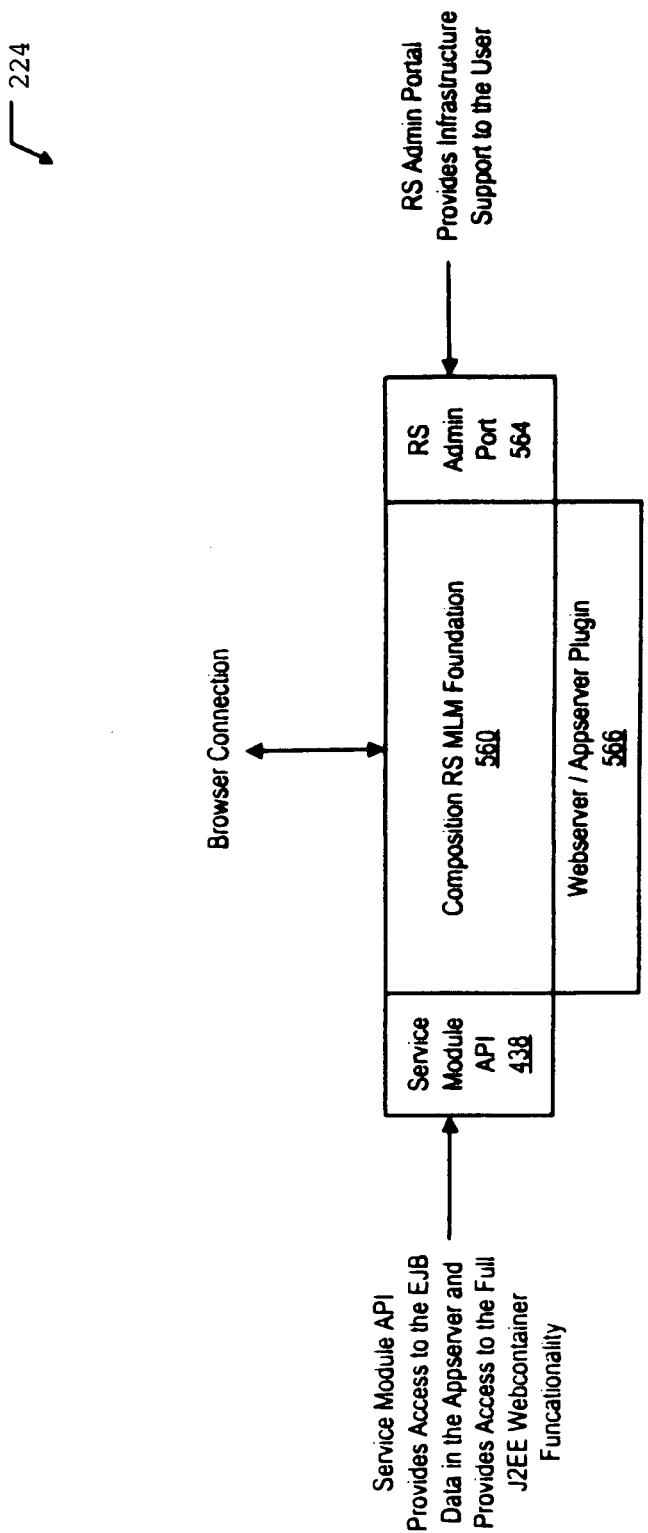
FIG. 10 shows a block diagram of a content generation MLM module.

Referring to FIG. 10, the remote services content generation MLM 224 provides HTML generation bases on the data held within the application server. The content generation MLM 224 provides a service module API 438 for service module creators to develop content composition for their data which is processed by the application server. The content is in the form of J2EE™ web container which supports Java™ servlets and Java™ servlet pages (JSP) API's.

The content generation MLM 224 communicates with the application server using the same Netscape™ API (NSAPI) plug-in as the remote services applications MLM. Instances of these two MLMs make up an MLM farm. The composition remote services foundation layer provides support for caching of HTML pages and associated data to reduce the data request hit back to the application server.

The remote services administration portal 564 provides control of the deployed customer infrastructure to the customer and control over the total infrastructure to trusted users.

Figure 11:
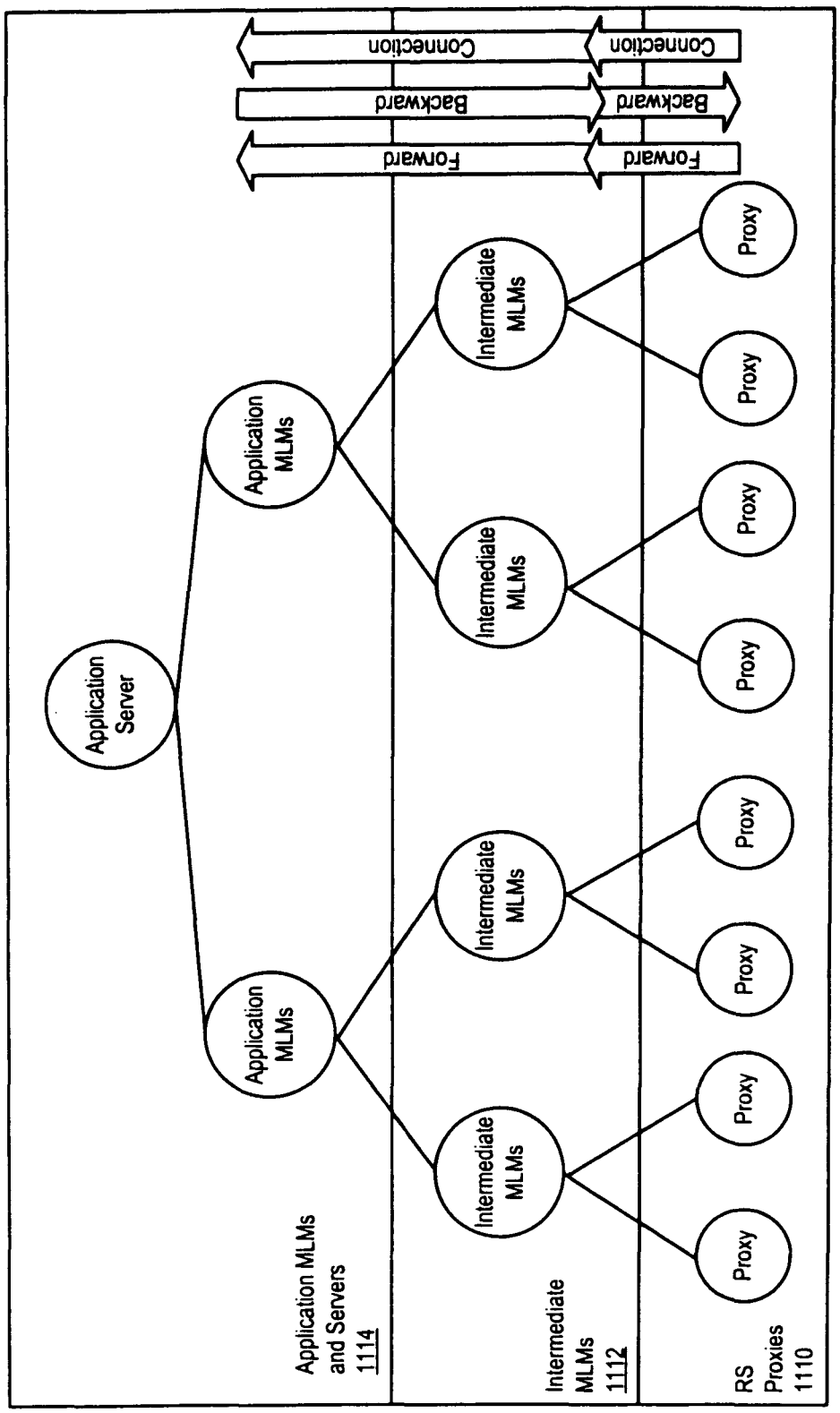
FIG. 11 shows a flow diagram of a remote services system communication.

FIG. 11 shows a flow diagram of communications within a remote services architecture. In one embodiment, the communications between a customer and a service provider is via a wide area network (W AN). Communications within the remote service architecture includes three tiers, a remote services proxy tier 1110, an intermediate MLM tier 1112 and an application MLM and server tier 1114. Communication is established and connections are made from the bottom tier (the remote services proxy tier) to the top tier.

The remote services architecture supports two application protocols for the majority of its services classification support: HTTP and Email messaging. There are a plurality of service module classifications that each have specific communications protocol relationships. More specifically, the service module classifications include a data collection classification, a monitoring classification, a remote access classification and an infrastructure administration classification.

With the data collection classification, the connection orientation is message based, the physical connection support may be Internet, private network or fax, and the protocols supported may be Email or HTTP. Examples of service modules of this classification include an inventory management service module and a performance management service module.

With the monitoring classification, the connection orientation is message based, the physical connection support may be Internet, private network or fax, and the protocols supported may be Email or HTTP. Examples of service modules of this classification include basic self service monitoring and full hardware monitoring with service action.

With the remote access classification, the connection orientation is session based, the physical connection support may be Internet, private network or fax, and the protocol supported is HTTP. The session based connection orientation is one way initiation from the customer. Examples of service modules of this classification include remote dial in analysis and remote core file analysis.

With the infrastructure administration classification, the connection orientation is session based or off-line installation, the physical connection support may be Internet, private network or fax, and the protocol supported includes HTTP, email or physical (e.g., telephone or CD). The session based connection orientation is one way initiation from the customer and the off-line installation is via, e.g., a CD. Examples of service modules of this classification include remote services administration, installation, updates, configuration and notification.

Encryption options are related to the protocol. A secure socket layer (SSL) protocol, for example, is likely to be the chosen protocol for an HTTP transmission, i.e., an HTTPS transmission. The remote services communication architecture does not enforce this however. So, for example, data could be sent by encrypting the body of an HTTP stream. This provides an advantage when a customer's HTTPS proxy infrastructure is not as resilient as their HTTP proxy infrastructure.

Email uses an email encryption option such as s-mime or encrypting the body using a third party encryption method such as POP. Encryption is optional at all stages. If the customer does not require encryption, then encryption need not be used.

Authentication of the remote services communication is standard for all protocols. Accordingly, the service provider may validate the sender of data and the customer may validate that the service provider is the receiver. Authentication is managed via certificates.

Certificates are used in both the client and server to authenticate a communications session. Client certificates are generated during the customer registration process and are built into the remote services proxy and the customer MLM. By default, each customer is provided a client certificate. The customer can, however, define specific security groups within their service domain and request additional client certificates for those domains. Remote services processes include a certificate distribution mechanism, supporting either the creation of a new security group within an existing customer or the redeployment of a new certificate after a certificate is compromised.

Figure 12:
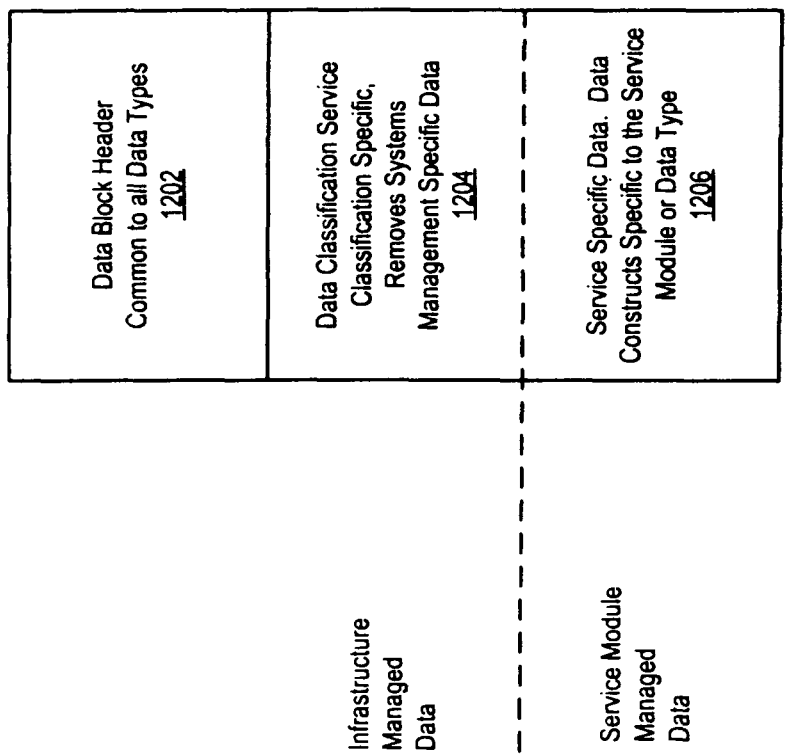
FIG. 12 shows a block diagram of the data blocks that comprise the data that flows through the remote services infrastructure.

FIG. 12 shows a block diagram of the data blocks that comprise the data that flows through the remote services infrastructure. Each system management system conforms to the data definitions that are part of the remote services proxy integrators API. The remote services communications architecture provides a normalized view of the data, regardless of in which systems management framework the data originated.

Data block header 1202 is common to all data types. Data block header 1202 contains items such as source, routing information, time to transmit and source type. Data block header 1202 is used to route the data correctly through the remote services system to the correct service module. Data block header 1202 is used to provide diagnostic and quality of service measurement built into the system.

Infrastructure data block 1204 provides data classification service classification specific data. Infrastructure data block 1204 removes systems management specific data.

Service module data block 1206 provides format based on each service classification that drives the system the systems management normalization of the data that flows through the system. For example, alarm data includes general characteristics defined such as severity, state and originating support instance.

Figure 13A:
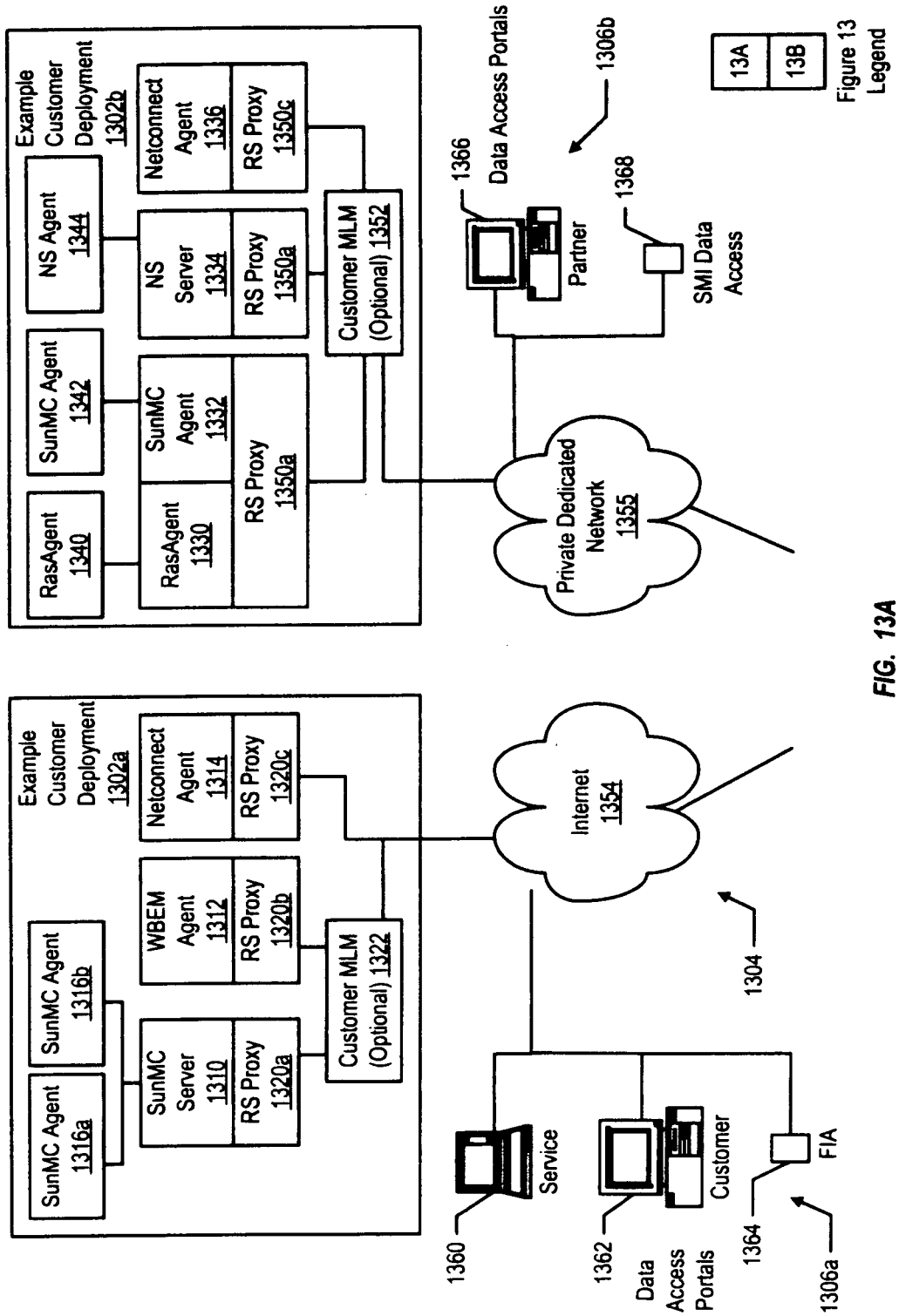
FIGS. 13A and 13B show an example of the high level architecture component relationships of a remote services system that is configured according to the remote services architecture.
Figure 13B:
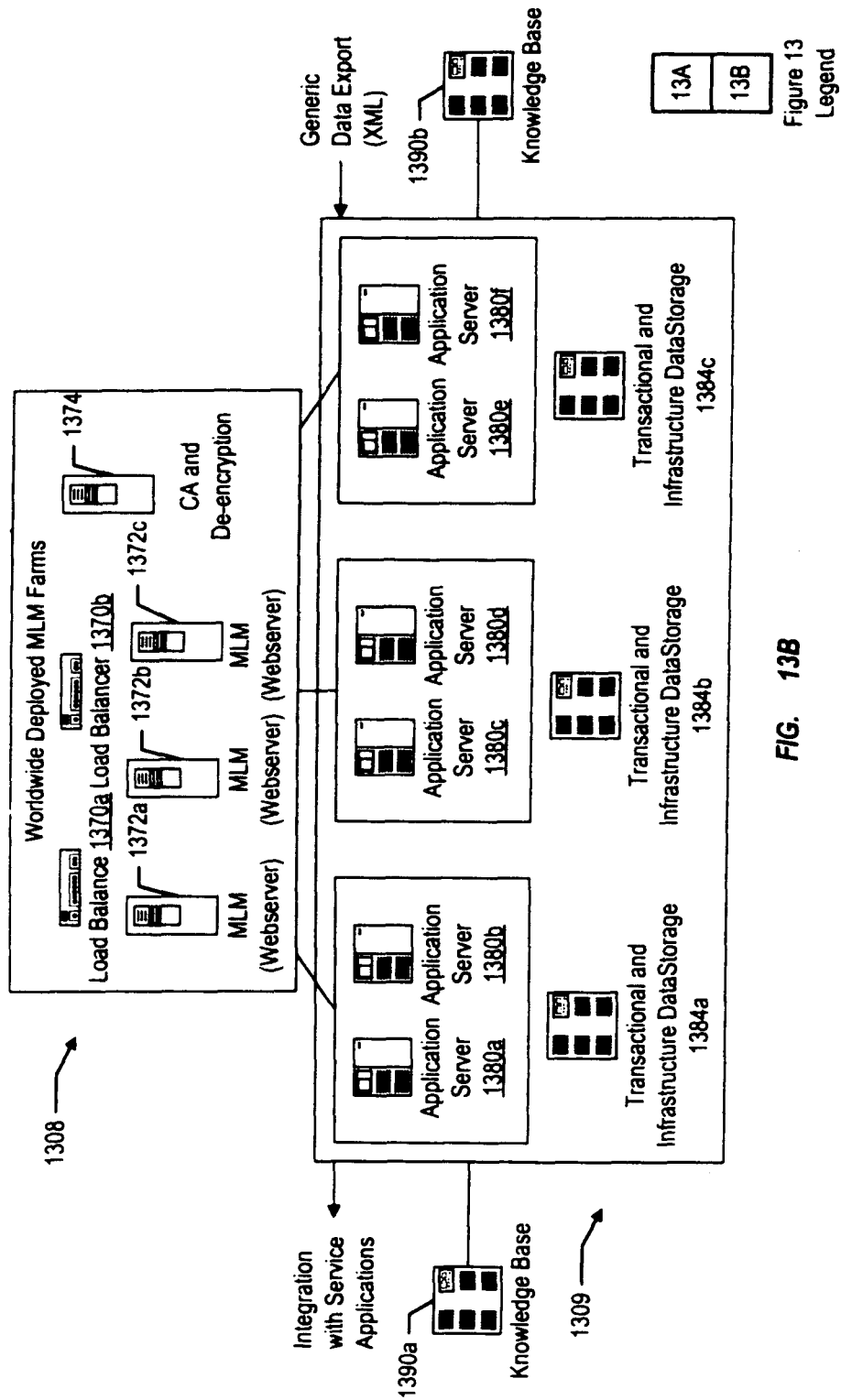

FIGS. 13A and 13B show an example of the component relationships of a remote services system that is configured according to the remote services architecture. Various components of the remote services system execute modules of the remote services infrastructure architecture. Remote services system includes customer deployment portion 1302a, 1302b, network portion 1304, data access portal 1306a, 1306b, Mid Level Manager (MLM) portion 1308, and application server portion.

Customer deployment portion 1302a sets forth an example customer deployment. More specifically, customer deployment portion 1302a includes SunMC server 1310, WBEM agent 1312, and Netconnect Agent 1314. SunMC agents 1316a, 1316b are coupled to SunMC server 1310. Server 1310, Agent 1312 and Agent 1314 are each coupled to a respective remote services proxy 1320a, 1320b, 1320c. Remote services proxies 1320a, 1320b, 1320c are coupled to network portion 1304, either directly, as shown with proxy 1320c, or via customer MLM 1322, as shown with proxies 1320a and 1320b. Proxies 1320a and 1320b may also be directly coupled to network portion without the MLM 1322 present. The SunMC server is a provider specific systems management server (i.e., health management server). The SunMC agents are provider specific systems management agents (i.e., health management agents). The WEBM agent is a web based enterprise management agent. The Netconnect agent is a basic collection agent. Customer deployment portion 1302a illustrates that the systems management may be 2-tier (e.g., agent, console) or 3-tier (e.g., agent, server, console).

Customer deployment portion 1302b sets forth another example customer deployment. More specifically, customer deployment portion 1302b includes RasAgent 1330, SunMC agent 1332, NS server 1334 and Netconnect Agent 1336. RasAgent 1340 is coupled to RasAgent 1330. SunMC Agent 1342 is coupled to SunMC Agent 1332. NSAgent 1344 is coupled to Netconnect Agent 1336. RasAgent 1330 and SunMC Agent 1332 are coupled to remote services proxy 1350a. Metropolis Server 1334 is coupled to remote service proxy 1350b. Netconnect Agent 1336 is coupled to remote services proxy 1350c. Remote services proxies 1350a, 1350b, 1350c are coupled to network portion 1304 either via customer MLM 1352 or directly. The RasAgent is a reliability, availability, serviceability agent. The NSAgent is a network storage agent and the NS server is a network storage server. Both the NSAgent and the NS server are reliability, availability, serviceability type devices.

Network portion 1304 includes at least one interconnection network such as the Internet 1354 and/or a private dedicated network 1355. Internet 1354 is assumed to be an existing connection that is reused by the remote services system. The private dedicated network 1355 is a dedicated link that is used exclusively by the remote services system to connect the customer to the service provider. The data to manage the private network is provided by directory services technology held within the application server portion 1308. The directory services technology handles all of the domain name service (DNS) services used to manage name to allocated internet protocol (IP) information. The remote services infrastructure also offers transmission over fax from the customer's environment (not shown). The fax communication is for service modules where the fax transmission makes sense. For example, fax transmission may be used in a military site which does not allow electronic information to be transmitted from it.

Data access portal portions 1306a and 1306b provide access to the remote services system. More specifically, data access portal portion 1306a includes a service access portion 1360, a customer access portion 1362 and a field information appliance (FIA) 1364. Data access portal portion 1306b includes a partner access portion 1366 and a system management interface (SMI) data access portion 1368.

Mid level manager portion 1308 includes load balancers 1370a, 1370b, MLM webservers 1372a, 1372b, 1372c and communication authentication (CA) and de-encryption server 1374.

Application server portion 1309 includes a plurality of application servers 1380a-1380f. Application servers 1380a, 1380b are associated with transactional and infrastructure data storage 1384a. Application servers 1380c, 1380d are associated with transactional and infrastructure data storage 1384b. Application servers 1380e, 13 80f are associated with transactional and infrastructure data storage 1384c. Application server portion 1309 also includes knowledge base 1390a, 1390b. Application server portion 1309 integrates with service applications as well as via generic data export (such as, e.g., XML).

Remote services proxies 1320, 1350 provide a System Management Integrators API. Using this API, system management products can integrate their customized handling of data into the common data format that is used by the remote services architecture. Accordingly, the system management component of the overall system is effectively segmented away from the remote services architecture.

Additionally, by using the remote services proxies 1320, 1350, the remote services architecture leverages much of a pre-existing instrumentation and data collection mechanisms that already exist. Accordingly, already deployed instrumentation agents within a remote service provider existing system such as those from SunMC and Netconnect may be integrated into a remote services system. Additionally, third party systems management systems may also be supported and integrated via the remote services proxies.

Customer deployment portions 1302a, 1302b each show an optional customer MLM component deployed to the customers environment. Whether to deploy the customer MLM component depends on a number of factors. More specifically, one factor is the number of support instances installed in the customer's environment and the number of services being utilized by the customer. A deployed MLM component can allow greater scale capabilities. Another factor is the type of services deployed within the customer environment. Some services are optimized when an MLM component is deployed to the customer environment to support service specific tasks such as filtering and data aggregation. Another factor is the quality of service. Deploying an MLM component provides a greater level of quality of service because the MLM component provides enhanced data communications technology within the MLM infrastructure modules.

The decision of whether to deploy a remote services MLM component (or more) to the customer's environment is a deployment decision. There are a number of architecture deployment classes which are used to meet the varying customer needs.

The remote services system communicates via two main protocols, HTTP and email. Security considerations for these protocols can be chosen by the customer and plugged into the system. For example, the HTTP protocol may use SSL. Additionally, the email protocol may use some well known form of encryption.

The connections from the customer deployment portion 1302 feed into MLM farms which reside within the SMI service provide environment. These MLM farms are sets of redundant web servers 1372 that are balanced using conventional load balancing technologies. Alongside these web servers 1372 are infrastructure servers 1374 which provide specific infrastructure acceleration for decryption and distribution of certificates for communications authentication.

These MLM farms provide a plurality of functions. The MLM server farms provide remote proxy connections. In deployments when an MLM is not deployed to the customer, the customer's proxy connects to the MLM farms within MLM portion 1308. Also, in deployments when a customer MLM 1322, 1372 is present, the MLM farm communicates and manages communication with the deployed customer MLM 1322, 1372. Also, the MLM server farms provide data processing capabilities, e.g., the MLM farms provide application specific tasks to prepare data for passing to the remote services application server portion 1309. Also, the MLM server farms provide access points for the customer and service personnel via browser like connections. The MLM farm generates the HTML that is presented to the browser.

The MLM technology is based upon known web server technology such as that available from Sun Microsystems under the trade designation iPlane™. Plug-in functionality is provided by the servlet and JSP interfaces available as part of the web server technology.

The remote services application servers 1380 provide data processing and storage for the remote services infrastructure as well as for any hosted service modules. The remote services application servers 1380 are based upon known application server technology such as that available from Sun Microsystems under the trade designation iPlanet™ application server 6.0. The remote services application server 1380 provides support for horizontal scalability, redundancy and load balancing. Thus providing the back-end components of the remote services architecture with a high level of built in assurance and flexibility. Application partitioning of the application servers 1380 provides processing distribution to ensure that heavy processing that may be required by more complex services are handled appropriately without affecting the remainder of the remote services architecture.

Application server portion 1309 provides integration into existing business systems, generic data export and tight integration with existing knowledge base implementations 1390. Data export is handled through structured XML, data can be exported asynchronously by a client registering to receive data of a particular type or synchronously by the application server 1380 accepting a request from a client.

The core service module API is provided by the application server 1380 using a J2EE implement API. The basic container services of J2EE are extended to provide remote services specific functions and to create the basis of the API. Accordingly, a service module creator can rely on a number of provided for services, such as database persistency, high levels of atomic, consistent, isolated, and durable (ACID) properties, directory service access, authorization protection for the data and access to the data collected by the remote services infrastructure itself.

The creation of a service module, which provides the technology to support a specific remote service, involves at least one of the following components: a creation of detection/collection logic component; a mid-stream analysis and management of data component; an analysis and storage of data component; and, a presentation and management of the data/knowledge component.

The detection/collection logic is created within the domain of a systems management toolkit. The mid-stream analysis and management of data is an optional step and effectively provides analysis of the data within the customer's environment. Inclusion of this logic would mean that the mid-stream analysis and management of data service module would have a remote services MLM deployed to the customer's environment 1302a, 1302b. The deployment of the remote services MLM to the customer's environment reduces and manages the data being sent over the WAN to the remote services provider. The analysis and storage of data component is performed within the application servers domain (the component may be exported). This analysis and storage of data component turns data into knowledge and service value that can then be presented back to the customer. The presentation and management of the data/knowledge component is where the data and knowledge that is developed from the analysis and storage of data component is presented to the customer or service personnel. The presentation and management of data/knowledge component may include interactive support to provide modification of the data values.

Automatic Distribution and Installation of Digital Certificates in a Secure Manner Accordingly, various embodiments of the present invention disclose a system and method for automatically installing a digital certificate in a secure manner. As a result, embodiments of the present invention are capable of storing digital certificates on a customer network without exposing the digital certificates to anyone with access to the customer network. In addition, embodiments of the present invention are capable of communicating with a customer that is holding a digital certificate that has been compromised for the generation and transmission of a new digital certificate. In effect, embodiments of the present invention are capable of distributing and installing a new certificate to replace the revoked or invalid certificate.

Figure 14:
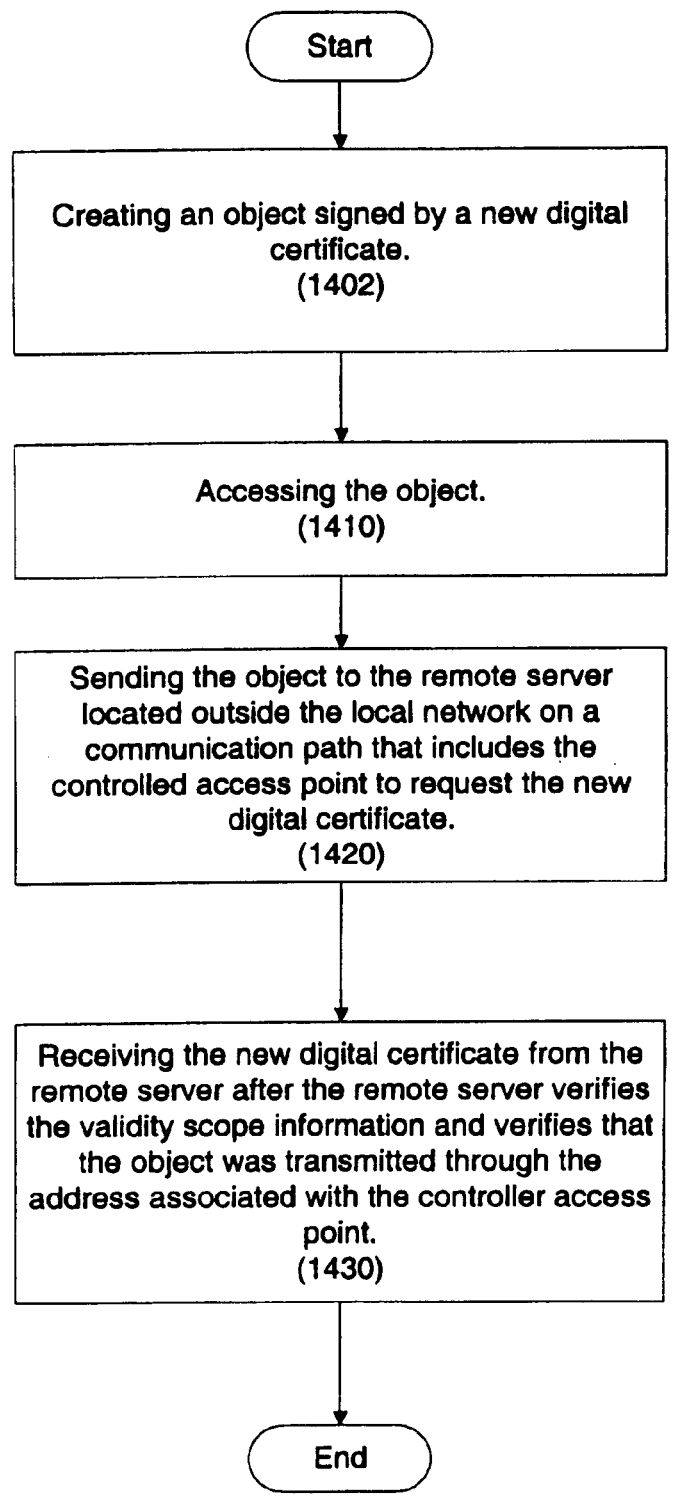
FIG. 14 is a flow chart illustrating steps in a computer implemented method for automatic distribution and installation of digital certificates in a secure manner, in accordance with one embodiment of the present invention.

Turning now to FIG. 14, a flow chart 1400 is disclosed illustrating steps in a computer implemented method for automatically distributing and installing digital certificates in a secure manner. The embodiment of the method of FIG. 14 is implemented when a digital certificate associated with a customer in a customer network has been compromised and is subject to unauthorized use or when the digital certificate is not yet installed. As a result, the embodiment of the method of FIG. 14 provides a means for securely identifying a customer, even though the digital certificate used for identification has been compromised.

The present embodiment provides for secure installation of a new digital certificate between a proxy server that is associated with a local customer network and a remote server. The remote server provides services for the local customer network and is capable of generating digital certificates that are used for identifying the customer and for establishing a secure communication channel between the remote server and the proxy server in the local customer network.

The present embodiment first creates an object signed by a new digital certificate at 1402 if the object does not exist. The object is stored internally within the local network associated with the customer and the object is used for requesting the new digital certificate from the remote server. That is, a request for the new digital certificate includes the object.

In one embodiment, the object comprises an extensible markup language (XML) text file. The XML text file comprises a request for the new digital certificate and/or identifying information associated with the new digital certificate, validity scope information, and an address associated with a controlled access point through which the object is transmitted when requesting the digital certificate. In addition, the validity scope information and the address must be verified and correct for the request to be valid.

The present embodiment partly relies on the security of the local network to provide for a secure means for identifying the customer associated with the local network. That is, the present embodiment controls access to the controlled access point. As such, a hacker that may gain access to the object but who doesn't have access to the controller access point cannot use the object to receive the certificate. As a result, the present embodiment is capable of providing a means for securely identifying a customer that is requesting a new digital certificate while using a default certificate, or a digital certificate that has been compromised. This is accomplished by ensuring that a request for a new digital certificate for the customer must go through a communication path that includes the controlled access point.

For instance, the controlled access point is the customer MLM (CMLM) of FIGS. 13A and 13B, in one embodiment. As such, for the request for the new digital certificate to be valid, the request must go through the CMLM that is specified in the object.

When the object is accessed at 1410, the present embodiment sends the object to the remote server that is located outside the local network at 1420. The object is included within a request for the new digital certificate. In addition, the object must be sent over a communication path that includes the controlled access point in order for the request to be valid.

As such, the remote server receives the request that includes the object. The remote server confirms that the address of the proxy server is correct, confirms that the validity scope information is correct, and confirms that the communication path used to receive this request includes the address of the controlled access point. Only after confirmation of this information will the remote server validate the request for the digital certificate and generate a new digital certificate for the customer.

In embodiments of the present invention, the validity scope information includes a list of Internet Protocol (IP) or host ID addresses, to include the proxy server. As a result, the remote server will only recognize requests for digital certificates from authorized addresses, such as the proxy server.

In other embodiments of the present invention, the validity scope information includes an expiration date. The expiration date provides further means of security since the object cannot be used beyond the expiration date and limits the exposure of the object 1540. In combination, the validity scope information in the object is be updated so that the object is constantly being refreshed. As a result, the remote server will only recognize objects with the updated validity scope information and updated controlled access points through which a request for a new digital certificate must pass through. As such, the present embodiment stores the updated or new object that includes the updated validity scope information and addresses associated with the controlled access points through which the object is transmitted.

In other embodiments, other data can be included within the validity scope information to be confirmed for validating the request for the new digital certificate. For instance, the validity scope information may include the name of the requested new digital certificate for the customer to be configured on the proxy server 1550, and a subsection with a valid configuration for the proxy server 1550.

As such, at 1430, the present embodiment receives the new digital certificate from the remote server after the remote server verifies the validity scope information, and verifies that the object was transmitted through the address associated with controlled access point.

In one embodiment, the object is digitally signed by the root signing authority. Since the object is digitally signed by the root signing authority, the object cannot be altered outside of the remote server. As such, even though an unauthorized person or entity may gain control over the object, the object cannot be altered to change the validity scope information or the controlled access point. As a result, the request for the new digital certificate must go through the controlled access point.

In another embodiment, the object is stored in the local network upon installation of the proxy server. In this manner, the object can be used upon initializing the proxy server in order to receive a new digital certificate that the customer can use to communicate with the remote server. As such, the transfer of the new digital certificate is performed in a secure manner.

Figure 15:
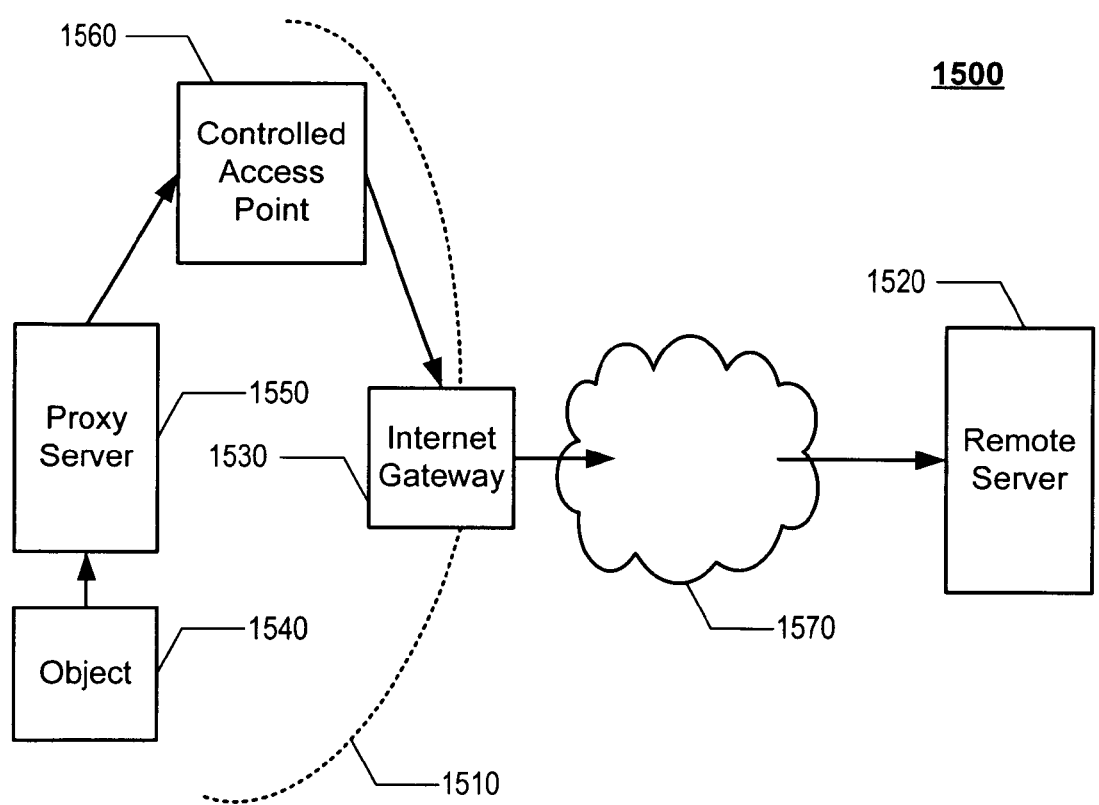
FIG. 15 is a block diagram illustrating a system for automatic distribution and installation of digital certificates, and the communication path through a designated controlled access point for providing secure communication, in accordance with one embodiment of the present invention.

FIG. 15 is block diagram illustrating a system 1500 for installing a digital certificate for access by a customer in a local network 1510, in accordance with one embodiment of the present invention. The system 1500 does not directly expose the digital certificate within the local network 1510 in order to provide for more security over conventional systems. In addition, the system 1500 is capable of authenticating a customer of the local network even though an associated digital certificate may be compromised, and used by an unauthorized user.

The system 1500 comprises a proxy server 1550 that is located within the local network and is associated with a customer of the local network. The proxy server 1550 services the local network 1510 at the local level for an associated service application located at the remote server 1520.

The system 1500 also comprises a controlled access point 1560. The controlled access point is located in the local network 1510. The local network 1510 provides for controlled access. In particular, the local network 1510 provides for controlled access to the controlled access point 1560. In this manner, the present embodiment of the system 1500 is capable of utilizing the controlled access to provide for a secure means of identifying the customer that is associated with the local network 1510. That is, since there is limited access to the controlled access point, any communication through the controlled access point can be assumed to be secure, in one embodiment. In one embodiment, the controlled access point comprises a CMLM, as described previously.

The system 1500 also comprises a internet gateway 1530 through which communication is established between the proxy server 1550 in the local network 1510 and the remote server 1520. In one embodiment, the communication is established through a communication network, such as, the Internet, or a wide area network, etc.

The system 1500 also comprises an object 1540 that is stored in the local network that is secure and associated with the proxy server. The object is presented by the proxy server to the remote server 1520 to request a new digital certificate. That is, the request includes the object 1540.

In one embodiment, the object 1540 is digitally signed by the root signing authority, as described previously. That is, the remote server 1520 creates the object 1540 and digitally signs the object 1540. In this way, the object cannot be altered outside of the remote server 1520.

For security, the request is transmitted over a communication path that includes the controlled access point 1560. If the unauthorized user presents the object over a communication path that does not include the controlled access point, the request containing the object will be invalid.

As shown in FIG. 15, the request that includes the object 1540 is transmitted from the proxy server 1550 through the controlled access point 1560, and then to the internet gateway 1530 to be transmitted outside of the local network 1510. Thereafter, the request is transmitted through the communication network 1570 (e.g., the Internet) to the remote server 1520.

In one embodiment the object 1540 comprises a request for a new digital certificate and/or identifying information associated with the new digital certificate. The object is presented to the remote server using a default certificate. In another embodiment, the object is presented using a configured digital certificate that is configured to the proxy server 1550 for communication with the remote server 1520. In either case, the system 1500 is capable of distributing and installing a new digital certificate even though the default digital certificate or the configured digital certificate has been compromised and may be subject to unauthorized use.

In addition, the object 1540 comprises validity scope information that can be verified. That is, the validity scope information is known to the remote server 1520, and is used by the remote server 1520 for creating the object 1540. For instance, the validity scope information includes the internet protocol (IP) address of the proxy server 1550, or of any authorized proxy server that is authorized to make the request for the new digital certificate. The validity scope information also includes an expiration date, as described previously. The expiration date provides for further control over the object 1540, as the object 1540 is invalid when presented after the expiration date.

As such, the use of the object is restricted to a list or range of IP addresses, a list or range of host IDs, a list or range of customer MLMs, and an expiration date. That is, the validity scope information limits the valid exposure associated with the object.

The object 1540 and the information contained therein are updateable when a customer has access to the new certificate. Thus, the validity scope information and the address of the controlled access point can be updated, so that on a periodic basis, a new version of the object is used for authenticating the customer at the local network 1510 to the remote server 1520.

In addition, the validity scope information also includes the address associated with the controlled access point. In this way, the validity scope information provides the communication path through which the request for the new digital certificate must be transmitted. For instance, for security, the communication path must include the controlled access point 1560.

In one embodiment, the object 1540 comprises an XML text file, as described previously. In this manner, the communication path for the request can be transmitted through the object 1540 to the remote server 1520 in the XML text file. In this way, the object 1540 may specify the network path which must be used to send the certificate request and therefore access the new digital certificate. That is, to be able to access the new certificate, an unauthorized user will not only need to have access to the object 1540, but also must send the certificate request through the network path specified, which requires access to the customer local network 1510, and especially the controlled access point 1560.

Figure 16:
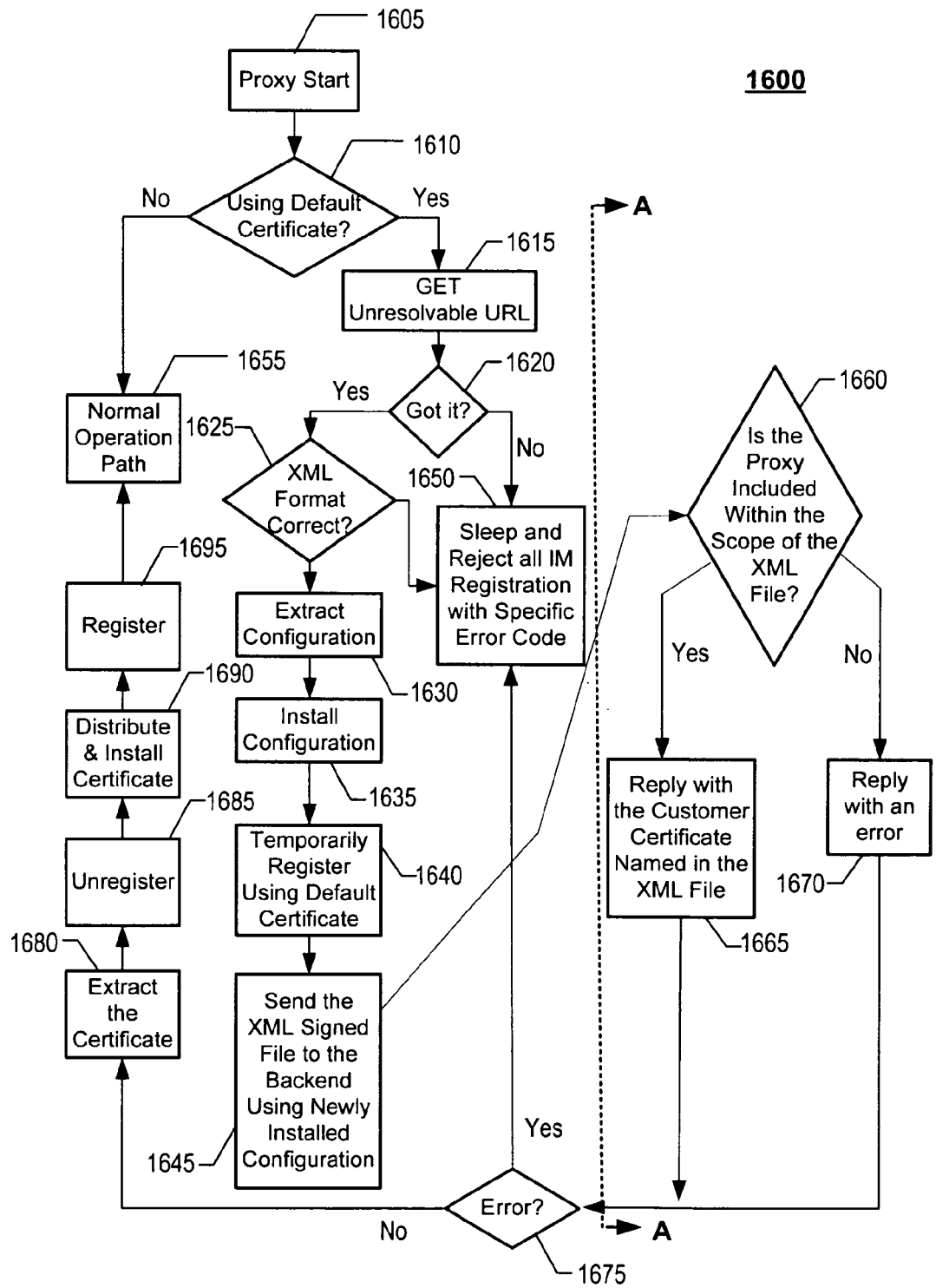
FIG. 16 is a flow chart illustrating steps in s a computer implemented method for configuring a customer proxy server with a digital certificate in a secure manner, in accordance with one embodiment of the present invention.

FIG. 16 is a flow chart 1600 illustrating steps in a computer implemented method for automatically distributing and installing digital certificates and configuration files for a proxy server in a secure manner, in accordance with one embodiment of the present invention. The present embodiment limits the exposure of the digital certificate that identifies the customer.

The present embodiment delivers a pre-installed proxy server in a customer local network. The present embodiment is capable of enabling automatic configuration of the proxy for the right certificate and network configuration while limiting the security exposure of the certificate. Operations to the left of the line A-A are performed on the proxy server in the local network. Operations to the right of the line A-A are performed on the back end server, or remote server that provides services to the local network through the proxy server.

The pre-installed proxy server includes a valid default certificate that is installed in the proxy server. This default certificate is a generic valid certificate but is created and managed by the remote server that is providing remote services. In this way, the default certificate can only be altered by those with access to the remote server.

To create this object, the customer selects a configuration (Firewall setup, cMLM, etc.) as if the customer was in the process of downloading a proxy install bundle. The customer can then choose the certificate that will be used. The customer will then define the validity scope and the address of the controlled access point 1560. Then the XML file, in the form of the object, is generated and signed using the chosen certificate. In this way, the object can only be altered by the remote server.

The present embodiment of the method of flow chart 1600 is implemented upon proxy start at 1605. The present embodiment determines if the proxy server is using the default certificate at 1610. If the default certificate is not being used, the present embodiment proceeds along the normal operation path 1655 since the proxy server has already been configured with the new and valid digital certificate that is associated with the user. In this case, the digital certificate being used is valid and uncompromised.

On the other hand, if the proxy is using the default certificate, then the present embodiment considers the proxy server as 'not yet installed'. As such, the present embodiment proceeds to 1615 and accesses an unresolvable URL in order to access the object that contains the XML file including the customer digital certificate. The URL is pointing to a name that does not exist on the Internet, however, which can be defined by the customer on the DNS or NIS table, or host files.

At 1620, the present embodiment determines if the unresolvable URL has been accessed. If the unresolvable URL has not been accessed. The present embodiment proceeds to 1650 and the proxy is in a 'not configured' mode. In this mode, the proxy server sleeps and consumes the least possible resources of the host until the unresolvable URL can be obtained.

On the other hand, if the unresolvable URL has been accessed, then at 1625, the present embodiment determines if the XML file is in the correct format. That is, the present embodiment checks to see if the object is compliant. If the XML file is not in the correct format, the present embodiment proceeds to 1650 and sleeps until the retrieval of another object.

On the other hand, if the XML file is in the correct format, the present embodiment performs network configuration at 1630, 1635, and 1640. At 1630, the present embodiment extracts the configuration in the XML file. At 1635, the present embodiment installs the configuration. At 1640, the present embodiment temporarily registers with the default digital certificate in order to set up communication with the back end server, or remote server.

At 1645, the present embodiment sends the object containing the XML file to the back end server. The back end server has originally digitally signed the object and as such can understand when the object has been altered.

Thereafter, in the present embodiment, at 1660 the back end server receives the object and validates the validity scope information contained within the object. That is, the validity scope information, such as, host ID, expiration date, etc. is verified to be current and accurate. Also, the present embodiment verifies that the object was transmitted through the correct transmission path to include the controlled access point, such as, the customer MLM, on the local network.

If the validity scope information and the communication path are verified, then the object is valid and the back end server retrieves the customer digital certificate that is named in the XML file of the object and returns the new customer digital certificate to the proxy server at 1665.

On the other hand, at 1670, if the validity scope information and/or the communication path are not verified, then the object is invalid, and the back end server returns an error. As such, at decision step 1675, if an error is returned, the present embodiment proceeds to 1650 and returns back to sleep mode.

However, if the back end server returns the new customer digital certificate to the proxy server, the present embodiment performs network configuration using the new digital certificate at 1680, 1685, 1690, and 1695. That is, at 1680, the present embodiment extracts the certificate from the message coming from the back end server. At 1685, the present embodiment unregisters using the default digital certificate. At 1690, the present embodiment distributes and installs the new customer digital certificate as the valid configuration of the proxy server. At 1695, the present embodiment re-registers using the new customer digital certificate and proceeds to normal operations at 1655.

While the methods of embodiments illustrated in flow charts 1400 and 1600 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for distributing and installing digital certificates in a secure manner have been described. While the invention is described in conjunction with embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed:

1. A method for distributing and installing a digital certificate comprising:
   accessing an object, the object being used for requesting a new digital certificate from a remote server, the object comprising a request for the new digital certificate, validity scope information, and an address associated with a controlled access point through which the object is transmitted when requesting the new digital certificate;
   specifying through the object a network path to be used to send the request for the new digital certificate;
   sending the object to the remote server on a communication path that includes the controlled access point; and
   receiving the new digital certificate from the remote server after the remote server verifies the validity scope information and verifies that the object was transmitted through the address associated with the controlled access point.

2. The method of claim 1, further comprising:
   limiting access to the controlled access point.

3. The method of claim 1, further comprising:
   digitally signing the object by the new digital certificate.

4. The method of claim 1, wherein the validity scope information further comprises an expiration date.

5. The method of claim 1, further comprising:
   receiving a new object from the remote server with updated validity scope information and an updated controlled access point.

6. The method of claim 1, further comprising:
   storing the object in a local network upon installation of a proxy server.

7. The method of claim 1, wherein the remote server is located outside a local network.

8. A computer system comprising a processor and a computer readable memory coupled to the processor and comprising program instructions that, when executed, implement a method for distributing and installing a digital certificate comprising:
   creating an object signed by a root signing authority, the object being stored within a local network and being used for requesting a new digital certificate from a remote server, the object comprising a request for the new digital certificate, validity scope information, and an address associated with a controlled access point through which the object is transmitted when requesting the new digital certificate;
   specifying through the object a network path to be used to send the request for the new digital certificate;
   sending the object to the remote server located outside the local network on a communication path that includes the controlled access point to request the new digital certificate; and
   receiving the new digital certificate from the remote server after the remote server verifies the validity scope information and verifies that the object was transmitted through the address associated with the controlled access point.

9. The computer system of claim 8, wherein the method further comprises:
   limiting access to the controlled access point.

10. The computer system of claim 8, wherein the method further comprises:

digitally signing the object by the root signing authority.

11. The computer system of claim 8, wherein the validity scope information further comprises an expiration date.

12. The computer system of claim 8, wherein the method further comprises:

receiving a new object from the remote server with updated validity scope information and an updated controlled access point.

* * * * *